(12) United States Patent
Whitehead et al.

(10) Patent No.: US 8,000,381 B2
(45) Date of Patent: Aug. 16, 2011

(54) UNBIASED CODE PHASE DISCRIMINATOR

(75) Inventors: Michael L. Whitehead, Scottsdale, AZ (US); Steve R. Miller, Scottsdale, AZ (US)

(73) Assignee: Hemisphere GPS LLC, Calgary (CA)

( * ) Notice: Subject to any disclaimer, the term of this patent is extended or adjusted under 35 U.S.C. 154(b) by 631 days.

(21) Appl. No.: 12/037,542

(22) Filed: Feb. 26, 2008

(65) Prior Publication Data

US 2008/0205494 A1 Aug. 28, 2008

Related U.S. Application Data

(60) Provisional application No. 60/891,906, filed on Feb. 27, 2007.

(51) Int. Cl.
*H04B 1/00* (2006.01)

(52) U.S. Cl. ........ 375/150; 375/142; 375/147; 375/316; 375/340; 375/343; 342/352; 342/357.06; 342/357.12

(58) Field of Classification Search ............ 375/142, 375/147, 150, 316, 340, 343; 342/352, 357.06, 342/357.12
See application file for complete search history.

(56) References Cited

U.S. PATENT DOCUMENTS

| | | | |
|---|---|---|---|
| 3,585,537 A | 6/1971 | Rennick et al. | |
| 3,596,228 A | 7/1971 | Reed, Jr. et al. | |
| 3,727,710 A | 4/1973 | Sanders et al. | |
| 3,815,272 A | 6/1974 | Marleau | |
| 3,899,028 A | 8/1975 | Morris et al. | |
| 3,987,456 A | 10/1976 | Gelin | |
| 4,132,272 A | 1/1979 | Holloway et al. | |
| 4,170,776 A | 10/1979 | MacDoran | |
| 4,180,133 A | 12/1979 | Collogan et al. | |
| 4,398,162 A | 8/1983 | Nagai | |
| 4,453,614 A | 6/1984 | Allen et al. | |

(Continued)

FOREIGN PATENT DOCUMENTS

JP 07244150 9/1995

(Continued)

OTHER PUBLICATIONS

Rho, Hyundho et al., "Dual-Frequency GPS Precise Point Positioning with WADGPS Corrections", [retrieved on May 18, 2010]. Retrieved from the Internet: URL: http://gauss.gge.unb.ca/papers.pdf/iongnss2005.rho.wadgps.pdt (Jul. 12, 2006).

(Continued)

*Primary Examiner* — Leon Flores
(74) *Attorney, Agent, or Firm* — Law Office of Mark Brown, LLC; Mark E. Brown

(57) ABSTRACT

A feedback control law steers a reference phase that tracks the phase of a received code sequence. The reference phase clocks a track-reference signal consisting of a series of correlation kernels, over which data is extracted and then summed in various combinations. The correlation kernels are designed in such a manner that errors caused by multipath are eliminated or substantially reduced. Furthermore, the areas of the correlation kernels are balanced across level-transitions of a code and non-transitions to eliminate phase biases when tracking specific satellites. Extra care must be taken to balance the correlation kernels in this manner due to a little known aspect of GPS C/A codes. Specifically, not all C/A codes have the same ratio of level-transitions to non-transitions as has been assumed in prior art.

12 Claims, 18 Drawing Sheets

U.S. PATENT DOCUMENTS

| | | |
|---|---|---|
| 4,529,990 A | 7/1985 | Brunner |
| 4,637,474 A | 1/1987 | Leonard |
| 4,667,203 A | 5/1987 | Counselman, III |
| 4,689,556 A | 8/1987 | Cedrone |
| 4,694,264 A | 9/1987 | Owens et al. |
| 4,710,775 A | 12/1987 | Coe |
| 4,714,435 A | 12/1987 | Stipanuk et al. |
| 4,739,448 A | 4/1988 | Rowe et al. |
| 4,751,512 A | 6/1988 | Longaker |
| 4,769,700 A | 9/1988 | Pryor |
| 4,785,463 A | 11/1988 | Janc et al. |
| 4,802,545 A | 2/1989 | Nystuen et al. |
| 4,812,991 A | 3/1989 | Hatch |
| 4,813,991 A | 3/1989 | Hale |
| 4,858,132 A | 8/1989 | Holmquist |
| 4,864,320 A | 9/1989 | Munson et al. |
| 4,894,662 A | 1/1990 | Counselman |
| 4,916,577 A | 4/1990 | Dawkins |
| 4,918,607 A | 4/1990 | Wible |
| 4,963,889 A | 10/1990 | Hatch |
| 5,031,704 A | 7/1991 | Fleischer et al. |
| 5,100,229 A | 3/1992 | Lundberg et al. |
| 5,134,407 A | 7/1992 | Lorenz et al. |
| 5,148,179 A | 9/1992 | Allison |
| 5,152,347 A | 10/1992 | Miller |
| 5,155,490 A | 10/1992 | Spradley et al. |
| 5,155,493 A | 10/1992 | Thursby et al. |
| 5,156,219 A | 10/1992 | Schmidt et al. |
| 5,165,109 A | 11/1992 | Han et al. |
| 5,173,715 A | 12/1992 | Rodal et al. |
| 5,177,489 A | 1/1993 | Hatch |
| 5,185,610 A | 2/1993 | Ward et al. |
| 5,191,351 A | 3/1993 | Hofer et al. |
| 5,202,829 A | 4/1993 | Geier |
| 5,207,239 A | 5/1993 | Schwitalla |
| 5,239,669 A | 8/1993 | Mason et al. |
| 5,255,756 A | 10/1993 | Follmer et al. |
| 5,268,695 A | 12/1993 | Dentinger et al. |
| 5,293,170 A | 3/1994 | Lorenz et al. |
| 5,294,970 A | 3/1994 | Dornbusch et al. |
| 5,296,861 A | 3/1994 | Knight |
| 5,311,149 A | 5/1994 | Wagner et al. |
| 5,323,322 A | 6/1994 | Mueller et al. |
| 5,334,987 A | 8/1994 | Teach |
| 5,343,209 A | 8/1994 | Sennott et al. |
| 5,345,245 A | 9/1994 | Ishikawa et al. |
| 5,359,332 A | 10/1994 | Allison et al. |
| 5,361,212 A | 11/1994 | Class et al. |
| 5,365,447 A | 11/1994 | Dennis |
| 5,369,589 A | 11/1994 | Steiner |
| 5,375,059 A | 12/1994 | Kyrtsos et al. |
| 5,390,124 A | 2/1995 | Kyrtsos |
| 5,390,125 A | 2/1995 | Sennott et al. |
| 5,390,207 A | 2/1995 | Fenton et al. |
| 5,416,712 A | 5/1995 | Geier et al. |
| 5,442,363 A | 8/1995 | Remondi |
| 5,444,453 A | 8/1995 | Lalezari |
| 5,451,964 A | 9/1995 | Babu |
| 5,467,282 A | 11/1995 | Dennis |
| 5,471,217 A | 11/1995 | Hatch et al. |
| 5,476,147 A | 12/1995 | Fixemer |
| 5,477,458 A | 12/1995 | Loomis |
| 5,490,073 A | 2/1996 | Kyrtsos |
| 5,491,636 A | 2/1996 | Robertson |
| 5,495,257 A | 2/1996 | Loomis |
| 5,504,482 A | 4/1996 | Schreder |
| 5,511,623 A | 4/1996 | Frasier |
| 5,519,620 A | 5/1996 | Talbot et al. |
| 5,521,610 A | 5/1996 | Rodal |
| 5,523,761 A | 6/1996 | Gildea |
| 5,534,875 A | 7/1996 | Diefes et al. |
| 5,543,804 A | 8/1996 | Buchler et al. |
| 5,546,093 A | 8/1996 | Gudat et al. |
| 5,548,293 A | 8/1996 | Cohen |
| 5,561,432 A | 10/1996 | Knight |
| 5,563,786 A | 10/1996 | Torii |
| 5,568,152 A | 10/1996 | Janky et al. |
| 5,568,162 A | 10/1996 | Samsel et al. |
| 5,583,513 A | 12/1996 | Cohen |
| 5,589,835 A | 12/1996 | Gildea et al. |
| 5,592,382 A | 1/1997 | Colley |
| 5,596,328 A | 1/1997 | Stangeland et al. |
| 5,600,670 A | 2/1997 | Turney |
| 5,604,506 A | 2/1997 | Rodal |
| 5,608,393 A | 3/1997 | Hartman |
| 5,610,522 A | 3/1997 | Locatelli et al. |
| 5,610,616 A | 3/1997 | Vallot et al. |
| 5,610,845 A | 3/1997 | Slabinski |
| 5,612,883 A | 3/1997 | Shaffer et al. |
| 5,615,116 A | 3/1997 | Gudat et al. |
| 5,617,100 A | 4/1997 | Akiyoshi et al. |
| 5,617,317 A | 4/1997 | Ignagni |
| 5,621,646 A | 4/1997 | Enge et al. |
| 5,638,077 A | 6/1997 | Martin |
| 5,644,139 A | 7/1997 | Allen et al. |
| 5,664,632 A | 9/1997 | Frasier |
| 5,673,491 A | 10/1997 | Brenna et al. |
| 5,680,140 A | 10/1997 | Loomis |
| 5,684,696 A | 11/1997 | Rao et al. |
| 5,706,015 A | 1/1998 | Chen et al. |
| 5,717,593 A | 2/1998 | Gvili |
| 5,725,230 A | 3/1998 | Walkup |
| 5,731,786 A | 3/1998 | Abraham et al. |
| 5,739,785 A | 4/1998 | Allison et al. |
| 5,757,316 A | 5/1998 | Buchler |
| 5,765,123 A | 6/1998 | Nimura et al. |
| 5,777,578 A | 7/1998 | Chang et al. |
| 5,810,095 A | 9/1998 | Orbach et al. |
| 5,828,336 A | 10/1998 | Yunck et al. |
| 5,838,562 A | 11/1998 | Gudat et al. |
| 5,854,987 A | 12/1998 | Sekine et al. |
| 5,862,501 A | 1/1999 | Talbot et al. |
| 5,864,315 A | 1/1999 | Welles et al. |
| 5,864,318 A | 1/1999 | Cosenza et al. |
| 5,875,408 A | 2/1999 | Bendett et al. |
| 5,877,725 A | 3/1999 | Kalafus |
| 5,890,091 A | 3/1999 | Talbot et al. |
| 5,899,957 A | 5/1999 | Loomis |
| 5,906,645 A | 5/1999 | Kagawa et al. |
| 5,912,798 A | 6/1999 | Chu |
| 5,914,685 A | 6/1999 | Kozlov et al. |
| 5,917,448 A | 6/1999 | Mickelson |
| 5,918,558 A | 7/1999 | Susag |
| 5,919,242 A | 7/1999 | Greatline et al. |
| 5,923,270 A | 7/1999 | Sampo et al. |
| 5,926,079 A | 7/1999 | Heine et al. |
| 5,927,603 A | 7/1999 | McNabb |
| 5,928,309 A | 7/1999 | Korver et al. |
| 5,929,721 A | 7/1999 | Munn et al. |
| 5,933,110 A | 8/1999 | Tang |
| 5,935,183 A | 8/1999 | Sahm et al. |
| 5,936,573 A | 8/1999 | Smith |
| 5,940,026 A | 8/1999 | Popeck |
| 5,941,317 A | 8/1999 | Mansur |
| 5,943,008 A | 8/1999 | Dusseldorp |
| 5,944,770 A | 8/1999 | Enge et al. |
| 5,945,917 A | 8/1999 | Harry |
| 5,949,371 A | 9/1999 | Nichols |
| 5,955,973 A | 9/1999 | Anderson |
| 5,956,250 A | 9/1999 | Gudat et al. |
| 5,969,670 A | 10/1999 | Kalafus et al. |
| 5,987,383 A | 11/1999 | Keller et al. |
| 6,014,101 A | 1/2000 | Loomis |
| 6,014,608 A | 1/2000 | Seo |
| 6,018,313 A | 1/2000 | Engelmayer et al. |
| 6,023,239 A | 2/2000 | Kovach |
| 6,052,647 A | 4/2000 | Parkinson et al. |
| 6,055,477 A | 4/2000 | McBurney et al. |
| 6,057,800 A | 5/2000 | Yang et al. |
| 6,061,390 A | 5/2000 | Meehan et al. |
| 6,061,632 A | 5/2000 | Dreier |
| 6,062,317 A | 5/2000 | Gharsalli |
| 6,069,583 A | 5/2000 | Silvestrin et al. |
| 6,076,612 A | 6/2000 | Carr et al. |
| 6,081,171 A | 6/2000 | Ella |
| 6,100,842 A | 8/2000 | Dreier et al. |
| 6,122,595 A | 9/2000 | Varley et al. |

| | | |
|---|---|---|
| 6,128,574 A | 10/2000 | Diekhans |
| 6,144,335 A | 11/2000 | Rogers |
| 6,191,730 B1 | 2/2001 | Nelson, Jr. |
| 6,191,733 B1 | 2/2001 | Dizchavez |
| 6,198,430 B1 | 3/2001 | Hwang et al. |
| 6,198,992 B1 | 3/2001 | Winslow |
| 6,199,000 B1 | 3/2001 | Keller et al. |
| 6,205,401 B1 | 3/2001 | Pickhard et al. |
| 6,215,828 B1 | 4/2001 | Signell et al. |
| 6,229,479 B1 | 5/2001 | Kozlov et al. |
| 6,230,097 B1 | 5/2001 | Dance et al. |
| 6,233,511 B1 | 5/2001 | Berger et al. |
| 6,236,916 B1 | 5/2001 | Staub et al. |
| 6,236,924 B1 | 5/2001 | Motz |
| 6,253,160 B1 | 6/2001 | Hanseder |
| 6,256,583 B1 | 7/2001 | Sutton |
| 6,259,398 B1 | 7/2001 | Riley |
| 6,266,595 B1 | 7/2001 | Greatline et al. |
| 6,285,320 B1 | 9/2001 | Olster et al. |
| 6,292,132 B1 | 9/2001 | Wilson |
| 6,307,505 B1 | 10/2001 | Green |
| 6,313,788 B1 | 11/2001 | Wilson |
| 6,314,348 B1 | 11/2001 | Winslow |
| 6,325,684 B1 | 12/2001 | Knight |
| 6,336,066 B1 | 1/2002 | Pellenc et al. |
| 6,345,231 B2 | 2/2002 | Quincke |
| 6,356,602 B1 | 3/2002 | Rodal et al. |
| 6,377,889 B1 | 4/2002 | Soest |
| 6,380,888 B1 | 4/2002 | Kucik |
| 6,389,345 B2 | 5/2002 | Phelps |
| 6,392,589 B1 | 5/2002 | Rogers et al. |
| 6,397,147 B1 | 5/2002 | Whitehead et al. |
| 6,415,229 B1 | 7/2002 | Diekhans |
| 6,418,031 B1 | 7/2002 | Archambeault |
| 6,421,003 B1 | 7/2002 | Riley et al. |
| 6,424,915 B1 | 7/2002 | Fukuda et al. |
| 6,431,576 B1 | 8/2002 | Viaud et al. |
| 6,434,462 B1 | 8/2002 | Bevly et al. |
| 6,445,983 B1 | 9/2002 | Dickson et al. |
| 6,445,990 B1 | 9/2002 | Manring |
| 6,449,558 B1 | 9/2002 | Small |
| 6,463,091 B1 | 10/2002 | Zhodzicshsky et al. |
| 6,463,374 B1 | 10/2002 | Keller et al. |
| 6,466,871 B1 | 10/2002 | Reisman et al. |
| 6,469,663 B1 | 10/2002 | Whitehead et al. |
| 6,484,097 B2 | 11/2002 | Fuchs et al. |
| 6,501,422 B1 | 12/2002 | Nichols |
| 6,515,619 B1 | 2/2003 | McKay, Jr. |
| 6,516,271 B2 | 2/2003 | Upadhyaya et al. |
| 6,539,303 B2 | 3/2003 | McClure et al. |
| 6,542,077 B2 | 4/2003 | Joao |
| 6,549,835 B2 | 4/2003 | Deguchi |
| 6,553,299 B1 | 4/2003 | Keller et al. |
| 6,553,300 B2 | 4/2003 | Ma et al. |
| 6,553,311 B2 | 4/2003 | Aheam et al. |
| 6,570,534 B2 | 5/2003 | Cohen et al. |
| 6,577,952 B2 | 6/2003 | Geier et al. |
| 6,587,761 B2 | 7/2003 | Kumar |
| 6,606,542 B2 | 8/2003 | Hauwiller et al. |
| 6,611,228 B2 | 8/2003 | Toda et al. |
| 6,611,754 B2 | 8/2003 | Klein |
| 6,611,755 B1 | 8/2003 | Coffee et al. |
| 6,622,091 B2 | 9/2003 | Perlmutter et al. |
| 6,631,916 B1 | 10/2003 | Miller |
| 6,643,576 B1 | 11/2003 | O'Connor et al. |
| 6,646,603 B2 | 11/2003 | Dooley et al. |
| 6,657,875 B1 | 12/2003 | Zeng et al. |
| 6,671,587 B2 | 12/2003 | Hrovat et al. |
| 6,688,403 B2 | 2/2004 | Bernhardt et al. |
| 6,703,973 B1 | 3/2004 | Nichols |
| 6,711,501 B2 | 3/2004 | McClure et al. |
| 6,721,638 B2 | 4/2004 | Zeitler |
| 6,732,024 B2 | 5/2004 | Rekow et al. |
| 6,744,404 B1 | 6/2004 | Whitehead et al. |
| 6,754,584 B2 | 6/2004 | Pinto et al. |
| 6,774,843 B2 | 8/2004 | Takahashi |
| 6,792,380 B2 | 9/2004 | Toda |
| 6,819,269 B2 | 11/2004 | Flick |
| 6,822,314 B2 | 11/2004 | Beasom |
| 6,865,465 B2 | 3/2005 | McClure |
| 6,865,484 B2 | 3/2005 | Miyasaka |
| 6,900,992 B2 | 5/2005 | Kelly et al. |
| 6,922,635 B2 | 7/2005 | Rorabaugh |
| 6,931,233 B1 | 8/2005 | Tso et al. |
| 6,967,538 B2 | 11/2005 | Woo |
| 6,990,399 B2 | 1/2006 | Hrazdera et al. |
| 7,006,032 B2 | 2/2006 | King et al. |
| 7,026,982 B2 | 4/2006 | Toda et al. |
| 7,027,918 B2 | 4/2006 | Zimmerman et al. |
| 7,031,725 B2 | 4/2006 | Rorabaugh |
| 7,089,099 B2 | 8/2006 | Shostak et al. |
| 7,142,956 B2 | 11/2006 | Heiniger et al. |
| 7,162,348 B2 | 1/2007 | McClure et al. |
| 7,191,061 B2 | 3/2007 | McKay et al. |
| 7,231,290 B2 | 6/2007 | Steichen et al. |
| 7,248,211 B2 | 7/2007 | Hatch et al. |
| 7,271,766 B2 | 9/2007 | Zimmerman et al. |
| 7,277,784 B2 | 10/2007 | Weiss |
| 7,292,186 B2 | 11/2007 | Miller et al. |
| 7,324,915 B2 | 1/2008 | Altmann |
| 7,358,896 B2 | 4/2008 | Gradincic et al. |
| 7,373,231 B2 | 5/2008 | McClure et al. |
| 7,388,539 B2 | 6/2008 | Whitehead et al. |
| 7,395,769 B2 | 7/2008 | Jensen |
| 7,437,230 B2 | 10/2008 | McClure et al. |
| 7,451,030 B2 | 11/2008 | Eglington et al. |
| 7,479,900 B2 | 1/2009 | Horstemeyer |
| 7,505,848 B2 | 3/2009 | Flann et al. |
| 7,522,100 B2 | 4/2009 | Yang et al. |
| 7,571,029 B2 | 8/2009 | Dai et al. |
| 7,689,354 B2 | 3/2010 | Heiniger et al. |
| 7,730,366 B2 * | 6/2010 | Nakamura et al. ............ 714/700 |
| 2003/0014171 A1 | 1/2003 | Ma et al. |
| 2003/0187560 A1 | 10/2003 | Keller et al. |
| 2003/0208319 A1 | 11/2003 | Ell et al. |
| 2004/0039514 A1 | 2/2004 | Steichen et al. |
| 2004/0212533 A1 | 10/2004 | Whitehead et al. |
| 2005/0080559 A1 | 4/2005 | Ishibashi et al. |
| 2005/0225955 A1 | 10/2005 | Grebenkemper et al. |
| 2005/0265494 A1 | 12/2005 | Goodlings |
| 2006/0167600 A1 | 7/2006 | Nelson et al. |
| 2006/0215739 A1 | 9/2006 | Williamson et al. |
| 2006/0251173 A1 | 11/2006 | Wang et al. |
| 2007/0078570 A1 | 4/2007 | Dai et al. |
| 2007/0088447 A1 | 4/2007 | Stothert et al. |
| 2007/0121708 A1 | 5/2007 | Simpson |
| 2007/0205940 A1 | 9/2007 | Yang et al. |
| 2007/0285308 A1 | 12/2007 | Bauregger et al. |
| 2008/0129586 A1 | 6/2008 | Martin |
| 2008/0204312 A1 | 8/2008 | Euler |
| 2009/0171583 A1 | 7/2009 | DiEsposti |
| 2009/0174597 A1 | 7/2009 | DiLellio et al. |
| 2009/0174622 A1 | 7/2009 | Kanou |
| 2009/0177395 A1 | 7/2009 | Stelpstra |
| 2009/0177399 A1 | 7/2009 | Park et al. |
| 2009/0259397 A1 | 10/2009 | Stanton |
| 2009/0259707 A1 | 10/2009 | Martin et al. |
| 2009/0262014 A1 | 10/2009 | DiEsposti |
| 2009/0262018 A1 | 10/2009 | Vasilyev et al. |
| 2009/0262974 A1 | 10/2009 | Lithopoulos |
| 2009/0265054 A1 | 10/2009 | Basnayake |
| 2009/0265101 A1 | 10/2009 | Jow |
| 2009/0265104 A1 | 10/2009 | Shroff |
| 2009/0273372 A1 | 11/2009 | Brenner |
| 2009/0273513 A1 | 11/2009 | Huang |
| 2009/0274079 A1 | 11/2009 | Bhatia et al. |
| 2009/0274113 A1 | 11/2009 | Katz |
| 2009/0276155 A1 | 11/2009 | Jeerage et al. |
| 2009/0295633 A1 | 12/2009 | Pinto et al. |
| 2009/0295634 A1 | 12/2009 | Yu et al. |
| 2009/0299550 A1 | 12/2009 | Baker |
| 2009/0322597 A1 | 12/2009 | Medina Herrero et al. |
| 2009/0322598 A1 | 12/2009 | Fly et al. |
| 2009/0322600 A1 | 12/2009 | Whitehead et al. |
| 2009/0322601 A1 | 12/2009 | Ladd et al. |
| 2009/0322606 A1 | 12/2009 | Gronemeyer |
| 2009/0326809 A1 | 12/2009 | Colley et al. |
| 2010/0013703 A1 | 1/2010 | Tekawy et al. |

| | | | |
|---|---|---|---|
| 2010/0026569 | A1 | 2/2010 | Amidi |
| 2010/0030470 | A1 | 2/2010 | Wang et al. |
| 2010/0039316 | A1 | 2/2010 | Gronemeyer et al. |
| 2010/0039318 | A1 | 2/2010 | Kmiecik et al. |
| 2010/0039320 | A1 | 2/2010 | Boyer et al. |
| 2010/0039321 | A1 | 2/2010 | Abraham |
| 2010/0060518 | A1 | 3/2010 | Bar-Sever et al. |
| 2010/0063649 | A1 | 3/2010 | Wu |
| 2010/0084147 | A1 | 4/2010 | Aral |
| 2010/0085249 | A1 | 4/2010 | Ferguson et al. |
| 2010/0085253 | A1 | 4/2010 | Ferguson et al. |
| 2010/0103033 | A1 | 4/2010 | Roh |
| 2010/0103034 | A1 | 4/2010 | Tobe et al. |
| 2010/0103038 | A1 | 4/2010 | Yeh et al. |
| 2010/0103040 | A1 | 4/2010 | Broadbent |
| 2010/0106414 | A1 | 4/2010 | Whitehead |
| 2010/0106445 | A1 | 4/2010 | Kondoh |
| 2010/0109944 | A1 | 5/2010 | Whitehead et al. |
| 2010/0109945 | A1 | 5/2010 | Roh |
| 2010/0109947 | A1 | 5/2010 | Rintanen |
| 2010/0109948 | A1 | 5/2010 | Razoumov et al. |
| 2010/0109950 | A1 | 5/2010 | Roh |
| 2010/0111372 | A1 | 5/2010 | Zheng et al. |
| 2010/0114483 | A1 | 5/2010 | Heo et al. |
| 2010/0117899 | A1 | 5/2010 | Papadimitratos et al. |
| 2010/0117900 | A1 | 5/2010 | Van Diggelen et al. |

FOREIGN PATENT DOCUMENTS

| | | |
|---|---|---|
| WO | WO9836288 | 8/1998 |
| WO | WO0024239 | 5/2000 |
| WO | WO03019430 | 3/2003 |
| WO | WO2005/119386 | 12/2005 |
| WO | WO2009/066183 | 5/2009 |
| WO | WO2009126587 | 10/2009 |
| WO | WO2009/148638 | 12/2009 |

OTHER PUBLICATIONS

"Eurocontrol, Pegasus Technical Notes on SBAS", report [online], Dec. 7, 2004 [retrieved on May 18, 2010]. Retrieved from the Internet: <URL: http://www.icao.int/icao/en/ro/nacc/meetings/2004/gnss/documentation/Pegasus/tn.pdf>, (Dec. 7, 2004), p. 89 paras [0001]-[0004].

"ARINC Engineering Services, Interface Specification IS-GPS-200, Revision D", Online [retrieved on May 18, 2010]. Retrieved from the Internet;<URL: http://www.navcen.uscg.gov/gps/geninfo/IS-GPS-200D.pdf>, (Dec. 7, 2004), p. 168 para [0001].

Schaer, et al., "Determination and Use of GPS Differential Code Bias Values", Presentation [online]. Revtrieved May 18, 2010. Retrieved from the internet: <http://nng.esoc.esa.de/ws2006/REPR2.pdf>, (May 8, 2006).

"International Search Report", PCT/US10/26509., (Apr. 20, 2010).

Parkinson, Bradford W., et al., "Global Positioning System: Theory and Applications, vol. II", *Bradford W. Parkinson and James J. Spiker, Jr., eds., Global Positioning System: Theory and Applicaitons*, vol. II, 1995, AIAA, Reston, VA. USA, pp. 3-50, (1995),3-50.

"Orthman Manufacturing Co., www.orthman.com/htm;guidance.htm", 2004, regarding the "Tracer Quick-Hitch".

Lin, Dai et al., "Real-time Attitude Determination fro Microsatellite by Lamda Method Combined with Kalman Filtering", *A Collection fof the 22nd AIAA International Communications Satellite Systems Conference and Exhibit Technical Paers* vol. 1, Monetrey, California American Institute of Aeronautics and Astronautics, Inc., (May 2004),136-143.

Xu, Jiangning et al., "An EHW Architecture for Real-Time GPS Attitude Determination Based on Parallel Genetic Algorithm", *The Computer SocietyProceedings of the 2002 NASA/DOD Conference on Evolvable Hardware* (EH'02), (2002).

Han, Shaowel et al., "Single-Epoch Ambiguity Resolution for Real-Time GPS Attitude Determination with the Aid of One-Dimensional Optical Fiber Gyro", *GPS Solutions*, vol. 3, No. 1, pp. 5-12 (1999) John Wiley & Sons, Inc.

Park, Chansik et al., "Integer Ambiguity Resolution for GPS Based Attitude Determination System", *SICE 1998*, Jul. 29-31, Chiba, 1115-1120.

Last, J. D., et al., "Effect of skywave interference on coverage of radiobeacon DGPS stations", *IEEE Proc.-Radar. Sonar Navig.*, vol. 144, No. 3, Jun. 1997, pp. 163-168.

"International Search Report and Written Opinion", PCT/US2004/015678, filed May 17, 2004, Jun. 21, 2005.

"ISO", 11783 Part 7 Draft Amendment 1 Annex, Paragraphs B.6 and B.7.ISO 11783-7 2004 DAM1, ISO: Mar. 8, 2004.

Kaplan, E.D., "Understanding GPS: Principles and Applications", *Artech House*, MA, 1996.

Irsigler, M et al., "PPL Tracking Performance in the Presence of Oscillator Phase Noise", *GPS Solutions*, vol. 5, No. 4, pp. 45-57 (2002).

Ward, Phillip W., "Performance Comparisons Between FLL, PLL and a Novel FLL-Assisted-PLL Carrier Tracking Loop Under RF Interference Conditions", *11th Int. Tech Metting of the Satellite Division of the U.S. Inst. of Navigation*, Nashville, TN, Sep. 15-18, 1998, 783-795.

Bevly, David M., "Comparison of INS v. Carrier-Phase DGPS for Attitude Determination in the Control of Off-Road Vehicles", ION 55th Annual Meeting; Jun. 28-30, 1999; Cambridge, Massachusetts; pp. 497-504.

Keicher, R. et al., "Automatic Guidance for Agricultural Vehicles in Europe", *Computers and Electronics in Agriculture*, vol. 25, (Jan. 2000), 169-194.

"International Search Report", PCT/US09/49776, (Aug. 11, 2009).

"International Search Report", PCT/AU/2008/000002, (Feb. 28, 2008).

"International Search Report", PCT/US09/33693, (Mar. 30, 2009).

"International Search Report", PCT/US09/039686, (May 26, 2009).

"International Search Report / Written Opinion", PCT/US09/63591, (Jan. 11, 2010).

"International Search Report", PCT/US09/0668, (Dec. 9, 2009).

"International Search Report", PCT/US09/067693.

"International Search Report and Written Opinion", PCT/US10/21334, (Mar. 12, 2010).

"International Search Report,", PCT/US09/34376, (Nov. 2, 2009).

Takac, Frank et al., "SmartRTK: A Novel Method of Processing Standardised RTCM Network RTK Information for High Precision Positioning", *Proceedings of ENC GNSS 2008*, Toulouse, France,(Apr. 22, 2008).

"International Search Report", PCT/US09/33567, (Feb. 9, 2009).

"International Search Report and Written Opinion" PCT/IB2008/003796,, (Jul. 15, 2009).

* cited by examiner

| Clock-Edge Events within the 1023 chip-length C/A code of GPS ||||||| 
|---|---|---|---|---|---|---|
| PRN | Total Non-Transitions || Total Sign Transitions || Total L-H and H-L (Polarity Transitions) | Total Non Transitions | Difference (previous two columns) |
| | L-L | H-H | L-H | H-L | | | |
| 1 | 256 | 255 | 256 | 256 | 512 | 511 | 1 |
| 2 | 256 | 255 | 256 | 256 | 512 | 511 | 1 |
| 3 | 256 | 255 | 256 | 256 | 512 | 511 | 1 |
| 4 | 256 | 255 | 256 | 256 | 512 | 511 | 1 |
| 5 | 256 | 255 | 256 | 256 | 512 | 511 | 1 |
| 6 | 256 | 255 | 256 | 256 | 512 | 511 | 1 |
| 7 | 272 | 271 | 240 | 240 | 480 | 543 | -63 |
| 8 | 240 | 239 | 272 | 272 | 544 | 479 | 65 |
| 9 | 256 | 255 | 256 | 256 | 512 | 511 | 1 |
| 10 | 256 | 255 | 256 | 256 | 512 | 511 | 1 |
| 11 | 256 | 255 | 256 | 256 | 512 | 511 | 1 |
| 12 | 256 | 255 | 256 | 256 | 512 | 511 | 1 |
| 13 | 256 | 255 | 256 | 256 | 512 | 511 | 1 |
| 14 | 256 | 255 | 256 | 256 | 512 | 511 | 1 |
| 15 | 272 | 271 | 240 | 240 | 480 | 543 | -63 |
| 16 | 256 | 255 | 256 | 256 | 512 | 511 | 1 |
| 17 | 272 | 271 | 240 | 240 | 480 | 543 | -63 |
| 18 | 256 | 255 | 256 | 256 | 512 | 511 | 1 |
| 19 | 256 | 255 | 256 | 256 | 512 | 511 | 1 |
| 20 | 256 | 255 | 256 | 256 | 512 | 511 | 1 |
| 21 | 272 | 271 | 240 | 240 | 480 | 543 | -63 |
| 22 | 240 | 239 | 272 | 272 | 544 | 479 | 65 |
| 23 | 256 | 255 | 256 | 256 | 512 | 511 | 1 |
| 24 | 272 | 271 | 240 | 240 | 480 | 543 | -63 |
| 25 | 256 | 255 | 256 | 256 | 512 | 511 | 1 |
| 26 | 256 | 255 | 256 | 256 | 512 | 511 | 1 |
| 27 | 256 | 255 | 256 | 256 | 512 | 511 | 1 |
| 28 | 256 | 255 | 256 | 256 | 512 | 511 | 1 |
| 29 | 256 | 255 | 256 | 256 | 512 | 511 | 1 |
| 30 | 256 | 255 | 256 | 256 | 512 | 511 | 1 |
| 31 | 256 | 255 | 256 | 256 | 512 | 511 | 1 |
| 32 | 256 | 255 | 256 | 256 | 512 | 511 | 1 |

FIG. 9

Mass Balance Transition Correlation Kernel Mapped to Total Code Phase.

Mass Balance Transition Correlation Kernel Mapped to Fractional Code Phase.

Mass Balance Non-Transition Correlation Kernel Mapped to Total Code Phase.

Mass Balance Non-Transition Correlation Kernel Mapped to Fractional Code Phase

UNBIASED CODE PHASE DISCRIMINATOR

CROSS-REFERENCE TO RELATED APPLICATION

This application claims priority in U.S. Provisional Patent Application No. 60/891,906, filed Feb. 27, 2007, which is incorporated herein by reference.

BACKGROUND OF THE INVENTION

1. Field of the Invention

The present invention relates generally to communication, timing, or positioning devices that receive signals containing, encoded within, a known sequence positive and negative symbols of unknown phase, and particularly to devices that achieve reduction in errors resulting from multipath.

The invention discloses a method to produce a track reference signal, that when correlated against a code signal, produces a correlative-phase-discriminator that can act as a measure of the offset of the track reference signal relative to the code signal.

2. Description of the Related Art

Precise phase estimation is required by ranging and coherent communications systems. Existing ranging systems include Global Navigation Satellite Systems (GNSS), such as the United States Global Positioning System (GPS) and the Russian's Global Navigation Satellite System (GLONASS). These systems utilize a direct sequence spread spectrum (DSSS) signaling technique which modulates a carrier with a pseudo-random code sequence and a navigation message bit sequence. The navigation message contains precise satellite orbital information, an ionosphere model and timing information. The GNSS receiver tracks the carrier and code signal phases to obtain ranging information which is ultimately used to calculate the user's position and internal clock error. Consider the GPS Coarse/Acquisition code bit. This code bit has a $1/(1.023 \times 10^6)$ second period which corresponds to a 300 m position resolution. Therefore, even a small 0.5° phase error corresponds to a large 0.4 m range error. Clearly, in the GNSS application, precise phase estimation is important.

When tracking a code signal, it is generally necessary to down-convert to base-band or near base-band using conventional digital carrier tracking methods such as a Costas loop. At base-band, carrier terms are removed to the degree that the remaining signal has a predominant code signal component. The phase of this code signal component may be tracked using a correlative code phase discriminator. Such a discriminator is the subject of this disclosure.

Most DSSS code bits, referred to as PN, PRN codes or chips, have a rectangular pulse shape with amplitudes +1 or −1 for the entire code bit period, $T_{Chip}$. An example code bit sequence is shown in FIG. 2A. Sometimes the code chips are depicted as 1's and 0's since they are digitally generated. It is important to note that in general DSSS systems are not restricted to rectangular code pulses and some systems design the code pulse shape to concentrate the desired power spectral density (dB-Watts/Hz) within a fixed bandwidth.

In acquiring the PN sequence for subsequent signal de-spreading, a track-reference signal is produced by the tracking hardware. This track reference signal will correlate in some manner with the PN sequence. The function of the code tracking loop is to keep the phase of the track-reference signal aligned to the phase of the incoming code signal by driving the phase error to zero. The control loop will advance or retard the track-reference signal in time until it aligns with the incoming signal (see FIG. 2B).

The code tracking loop consists of a phase discriminator, a loop filter and a Numerically Controlled Oscillator (NCO). The phase discriminator estimates the phase error between the incoming measured signal and the track-reference signal. The filtered phase error is output from the loop filter and provides a delta-phase. This delta-phase is accumulated in the NCO which adjusts the track-reference phase to drive the phase error to zero.

The control loop described above is referred to as a Delay Locked Loop (DLL). The original, continuous time DLL was originally described by Spilker (1961). He also introduces the derivative as the optimal correlation thereby proving that a DLL discriminator should only process on signal transitions and should remain zero elsewhere. The derivative is the maximum likelihood (ML) code bit transition estimator. The DLL is naturally extended to DSSS signals since the spreading (code bit) sequence is known in advance. This leads to the δ-delay Early-Late (EML) discriminator described by Gill (1966). Polydoros (1985) and Hurd (1970) analyzed loop performance with respect to δ for both low and high SNR and it was determined that the δ values other than ½ could be optimal.

SUMMARY OF THE INVENTION

A feedback control law steers a reference phase that tracks the phase of a received code sequence. The reference phase clocks a track-reference signal consisting of a two separate series of correlation kernels, one that operates on code transitions (a transition meaning a change in sign from one code chip to the next) and one that operates on non-transitions (a non-transition meaning that the sign of two adjacent chips remains the same). The correlation kernels define regions of support over which data from the incoming signal is captured, possibly inverted (and possibly scaled), and then accumulated. The accumulations are correlation outputs that, when properly combined, taking into account the number of transitions and non-transitions, form a correlative phase discriminator. The phase discriminator provides a measure of phase tracking error that is made available to a feedback control loop that aligns the reference phase to the incoming code phase. The correlation kernels are designed in such a manner that errors caused by multipath are eliminated or substantially reduced. Furthermore, the areas of the correlation kernels are balanced across level-transitions of a code and non-transitions to eliminate phase biases when tracking specific satellites. Extra care must be taken to balance the correlation kernels in this manner due to a little known aspect of GPS C/A codes. Specifically, not all C/A codes have the same ratio of level-transitions to non-transitions as has been assumed in prior art.

BRIEF DESCRIPTION OF THE DRAWINGS

The drawings constitute a part of this specification and include exemplary embodiments of the present invention and illustrate various objects and features thereof.

In FIG. 7A, the phase of the track reference signal is aligned to the code signal.

FIG. 9 is a table that provides information about the C/A PN codes of GPS. It shows total numbers of polarity transitions and non-transitions within the 1023 chip C/A code FIG. 9A depicts multipath of same polarity as direct signal and FIG. 9B depicts opposite-polarity multipath.

DETAILED DESCRIPTION OF THE INVENTION

1. Introduction

As required, detailed embodiments and/or aspects of the present invention are disclosed herein; however, it is to be understood that the disclosed embodiments/aspects are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
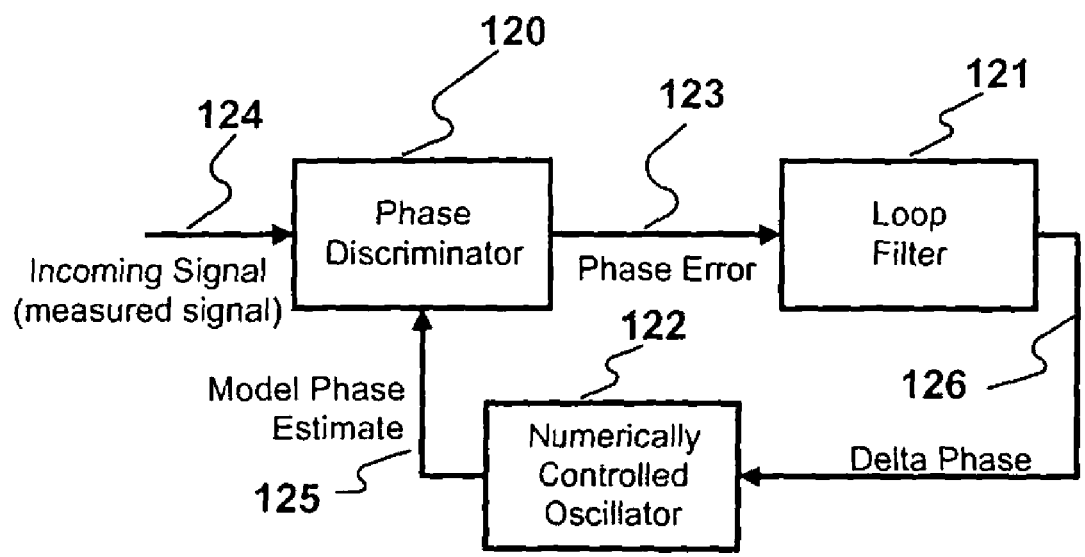
FIG. 1 shows a track feedback control loop for tracking the phase of a code signal.

FIG. 1 illustrates the three primary components of a code tracking loop: the phase discriminator 120, the loop filter 121 and the Numerically Controlled Oscillator (NCO) 122. The phase discriminator 120 generates an output error signal 123 proportional to the phase difference between the incoming (measured) signal to be tracked 124 and the current phase estimate 125. The error signal 123 is filtered by the loop filter 121 to reduce noise. The output of the loop filter 126 forms a delta-phase which drives the NCO 122. The NCO 122 is an accumulator whose new value is obtained by adding the delta-phase to the previous accumulator value. The delta-phase is added to the fractional phase every sample clock period or at some other prescribed rate. The accumulator is finite length so when the register overflows it marks the start of the next code bit in the sequence. Therefore, the NCO accumulator represents the fractional code bit phase with a range between 0 (inclusive) to 1.0 (exclusive).

Figure 2A:
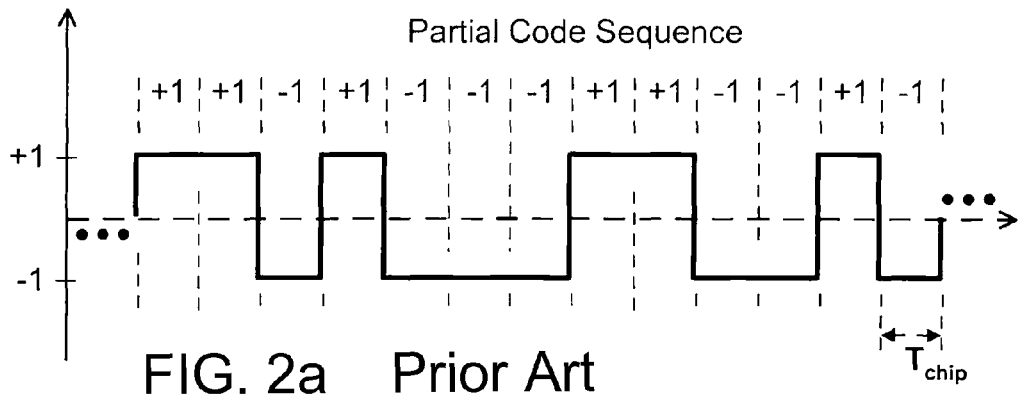
FIG. 2A shows a portion of a code sequence.
Figure 2B:
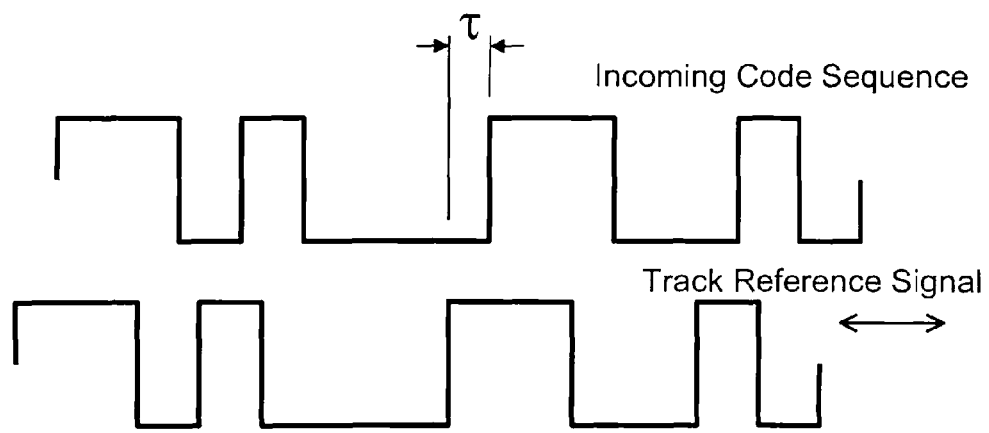
FIG. 2B shows the process of aligning a model track reference signal sequence with a code sequence. Both sequences are identical other than a time misalignment.

The control loop will advance or retard the model in time until it aligns with the incoming signal (see FIG. 2B). The phase error, $\tau$, is estimated by the phase discriminator 120 of FIG. 1 and then filtered by the loop filter 121. When the phase error is positive then the model is said to be early or advanced in time so the NCO phase accumulations need to be slowed. Consequently a positive phase error must reduce the delta-phase value being accumulated. Conversely, when the phase error is negative then the model is said to be late or retarded in time so the NCO phase accumulations need to be increased.

Therefore a negative phase error must increase the delta-phase value being accumulated.

Figure 2C:
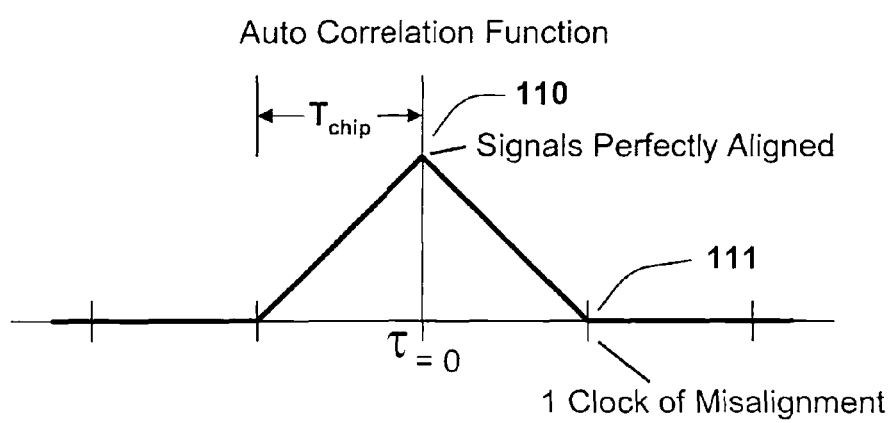
FIG. 2C shows the autocorrelation function that results when two similar PN sequences are correlated with one another. The horizontal axis is in chips of misalignment and the vertical axis is proportional to the integrated product of the two misaligned signals (the correlation).

The basic operation of the EML-based DLL is now described. The incoming signal is de-spread by cross-correlating the model of the code sequence with the measured signal. Specifically, the product is formed between the model and measured signal. This product is integrated over a specified accumulation time-interval and the result temporarily stored for subsequent software processing by the track loop. When the measured code signal and model code signal align, the maximum correlation value occurs. The correlation value as a function of timing error, τ, is shown in FIG. 2C. The ticks on the horizontal axis represent one clock period, $T_{chip}$, of the code. The correlation value is essentially zero outside of one clock period. As the codes align to within one clock period 111 or less, the correlation function ramps up linearly as alignment distance diminishes. The peak 110 in the correlation function is when the two code signals are perfectly aligned.

Figure 3A:
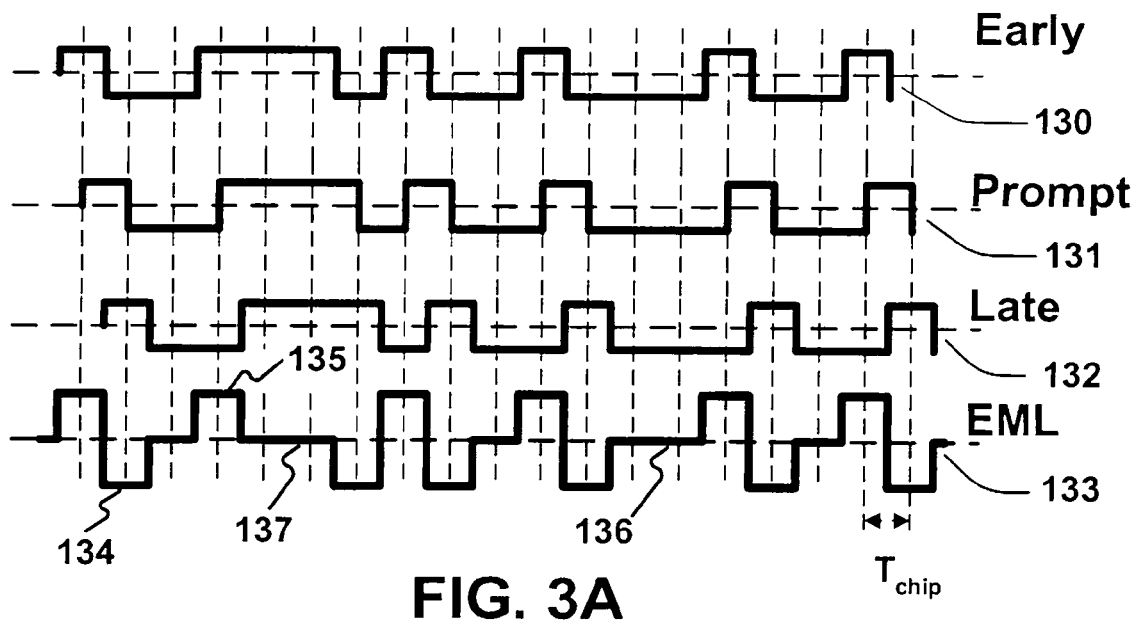
FIG. 3A presents and early, prompt, and late code sequence along with an early minus late (EML) code sequences. The early code sequence is ½ of a chip early with respect to prompt, and the late is ½ of a chip late with respect to prompt. The EML, which may be used as a track reference signal, is the difference of early signal with the late signal.
Figure 3B:
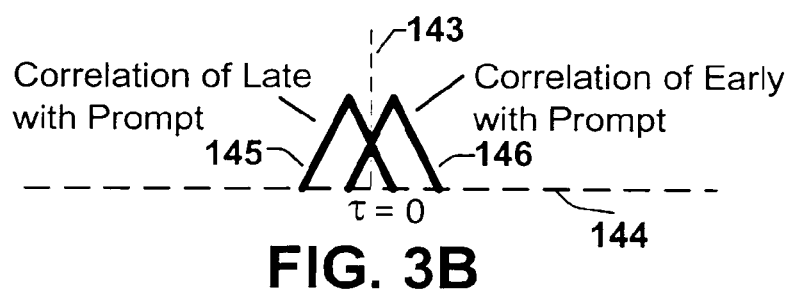
FIG. 3B presents the correlation functions of the early and late code sequences with the prompt code sequence.
Figure 3C:
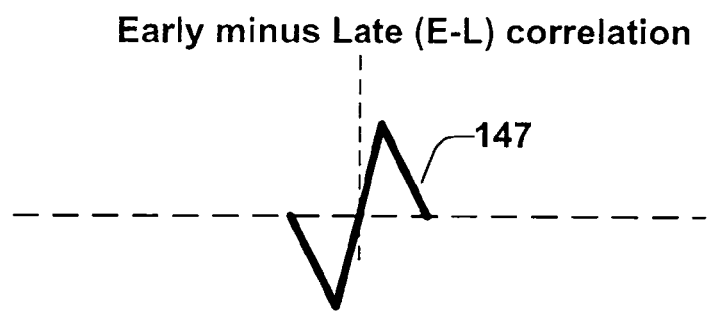
FIG. 3C is the correlation of the EML sequence with the prompt sequence. This correlation may be use as a code phase discriminator in a code tracking loop.

The EML phase discriminator obtains phase alignment by cross-correlating the incoming signal with a composite track reference signal equal to a δ-chip early model minus a δ-chip late model. Specifically, two exact replicas of the incoming code sequence are produced, whereby one is then shifted δ-chip early and the other shifted δ-chip late in time. The resulting late code sequence is subtracted from the early sequence. FIG. 3A below shows the δ=½ chip early sequence 130, a prompt 131, (or on-time sequence), a δ=½ chip late sequence 132, and the composite EML sequence 133. The prompt, in this case, represents the signal that we wish to track. FIG. 3B shows the correlation of the both the early and late sequences with the prompt sequence and FIG. 3C shows the correlation of early-minus-late sequence with the prompt. The correlation function is defined such that prompt 131 is the reference and is held stationary. The axis 144 is such that a delay in time alignment, τ, is considered positive and to the right. When the signal arrives earlier than prompt, its resulting correlation function 146 is shifted to the right since the signal must be delayed before it aligns with prompt. When the signal arrives later than prompt, its correlation function 145 is shifted to the left since it must advance to align with prompt. Note that the early-minus-late correlation function 147 crosses zero when τ=0, 143. That is, when early and late codes are balanced δ-chip on either side of a prompt code. The early-minus-late correlation pattern effectively provides the tracking software an error feedback that drives the track reference phase generator to track the prompt. This error is known as the discriminator of the delay-lock-loop.

When the incoming signal arrives early with respect to the model, more energy is present in the early correlation result and a positive error is produced. The positive error advances the reference phase and the PN (EML) model moves earlier in time. A negative error arises when the incoming signal arrives late and more energy shows up in the late sequence. This delays the reference phase. The error continuously drives the delay-lock-loop, which thereby adjusts the reference phase generator to maintain zero phase error.

The discriminator generates an EML signal by subtracting the late from the early codes as they are generated. It then has one EML signal that it multiplies with the incoming signal, accumulating this product and storing the EML correlation result. In either case, the discriminator produces zero error when phase aligns with the prompt signal.

Many factors affect the code phase discriminator: noise, signal amplitude, carrier offset, transition probability and multipath. All factors will reduce the phase detector gain. The dependence on amplitude can be eliminated by employing an automatic gain controller (AGC). The code tracking loop can function with a small carrier offset which is some fraction of the symbol rate. However, the carrier offset has the effect of reducing the signal's average amplitude which thereby reduces the phase detector gain. The code bit transition probability is set by the code bit sequence. A phase discriminator bias occurs due to multipath. Moreover, when the incoming signal is band limited at the receiver, some signal power is removed at the higher frequencies. This frequency truncation manifests itself as ringing in the time domain code pulse. This time-domain distortion directly increases the phase estimation variance. Consequently, it is desirable to match the receiver bandwidth to the transmit bandwidth to the extent practical for the system. Also, a non-rational sample rate to code rate ratio is desired to reduce phase estimation bias.

FIG. 3A shows the composite EML waveform 133 has four possible EML states: 134 corresponds to when the code transitions from high to low (H-L transition); 135 corresponds to when the code transitions from low to high (L-H transition); 136 corresponds to when the code remains low (non-transition) and finally 137 corresponds to when the code remains high (non-transition). Note that the EML value corresponding to non-transitions is zero; therefore states 136 and 137 are zero. These four states and correlation pulses can be generalized by introducing the notion of a correlation kernel.

The correlation kernel, or kernel, can have an arbitrary shape. The amplitude of the shape is referred to as weights and the boundary where the kernel is non-zero is called the region of support (ROS). Sub regions within the kernel are called correlation pulses (or just pulses). The ROS describes the non-zero area where the correlation will take place. The weighted average is required for optimal discrimination, in a minimum variance sense: It can include channel equalization and pulse shape filtering (when non rectangular code bits are used). Note that the EML correlation has two non-zero kernels, 134 and 135 in FIG. 3A respectively, which have the same weight magnitudes but apposite sign. Note that the weights are even symmetric about the model transition point.

In general four different correlation kernels exist corresponding to the four transitions states: (1) L-H transition; (2) H-L transition; (3) no transition but corresponding code chip low; and finally (4) no transition but corresponding code chip high. These kernels do not have to be the same; nor are they constrained to have equal energy (sum of kernel weight squared) since separate accumulators can be maintained for each state and the results scaled based upon the ratio of kernel weights. Recall that the EML kernels, 134 and 135 in FIG. 3A, are even symmetric about the model transition point. This symmetry is not required and other correlative kernels that are non-symmetric can be used. If not symmetric about the zero phase error point, a balancing weight, or mass, is required within the non-transition regions otherwise a phase discriminator bias will result. The phase discriminator will have a non-zero output corresponding to zero phase error. Again, the phase error bias is eliminated in non symmetric transition kernels by introducing a balancing mass such as a non-transition kernel. Consequently, non-symmetric transition kernels accompanied by non-transition kernels must account for transition and non-transition probabilities otherwise a phase discriminator bias will result. Note that in this case non equal transition and non-transition probabilities will result in a phase discriminator bias whereas in the EML case only the discriminator gain is reduced and no bias occurs.

Each correlation kernel can be formed using the NCO phase to define the region of support. The design of non-symmetric kernels shall be further disclosed as part of this invention.

Figures 4A, 4B:
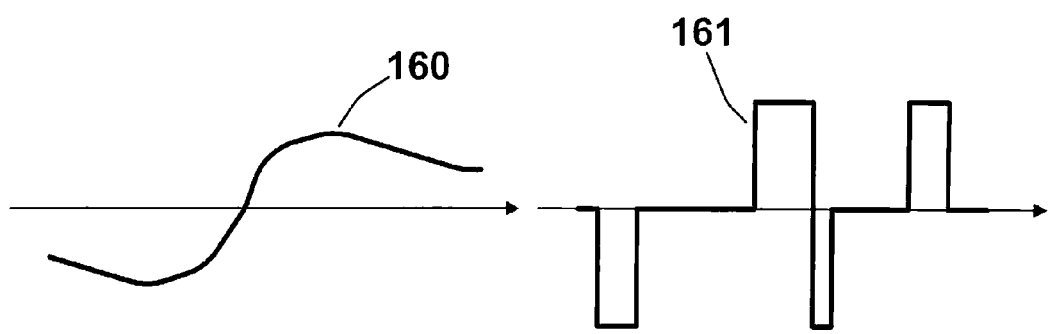
FIG. 4A shows a portion of a code signal.
FIG. 4B depicts a portion of a track reference signal.

The process of correlation involves the multiplication of one signal with another and summing or integrating the result. FIG. 4A through FIG. 4F illustrate the multiplication of two such signals. FIG. 4A shows a portion of a signal 160. In this invention, signal 160 comprises, at the minimum, a code signal or at least a signal highly correlated with a code signal. For the purpose of illustration, the signal 160 is shown without abrupt edges as would be the case if heavy filtering were applied. The process of converting to base-band by multiplying by sinusoidal terms could add other effects to the signal 160, but such effects are not shown. Furthermore, there is typically a large amount of noise on the signal 160 that is also not shown. One benefit of the summation or integration that takes place as part of the correlation is that it averages out effects of noise as well as high frequency periodic components.

Figures 4C, 4D:
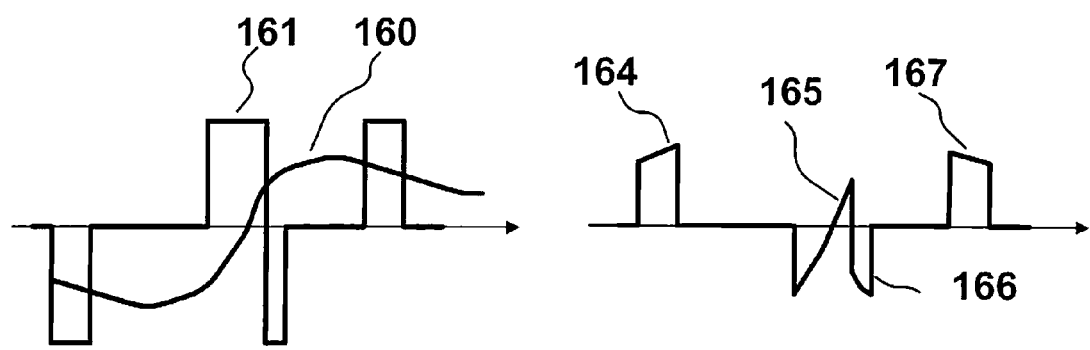
FIG. 4C depicts the signal of FIG. 4A and the track reference signal of FIG. 4B aligned to some relative phase for which the correlation will be performed.
FIG. 4D shows the result of multiplying the code signal by the track reference signal.

FIG. 4B depicts a portion of a track reference signal 161 that is to be correlated against the signal 160. In FIG. 4C, the signal 160 and the track reference signal 161 are shown aligned to some relative phase for which the correlation will be performed. When the track reference signal is designed in accordance with this disclosure, small errors between the phase of the track reference signal 161 and the phase of the code signal 160 are measurable through the correlation output. For small phase errors, the correlation output will be shown to be proportional to phase error. Consequently, this correlation may act as the phase discriminator in a feedback control loop, such loop steering the phase of track reference signal 161 to maintain phase alignment with the code signal 160.

FIG. 4D shows the result of the multiply. During multiplication, the track reference 161 signal acts as an enable, selecting portions of the signal 160 to remain non-zero only at the region of support of the correlation kernels, and areas outside the region of support of these kernels to be zeroed. The non-zero portions may also be scaled in amplitude and sign according to the value of the correlation kernels. As shown in FIG. 4D, four non-zero regions remain after the multiply. The regions 164 and 166 are seen to reverse sign from the original signal 160 due to track reference signal having a negative correlation kernel over this region. Regions 165 and 167 remain unchanged in sign relative to the original signal 160. All regions may undergo a scaling in signal amplitude, although this is not shown.

Figures 4E, 4F:
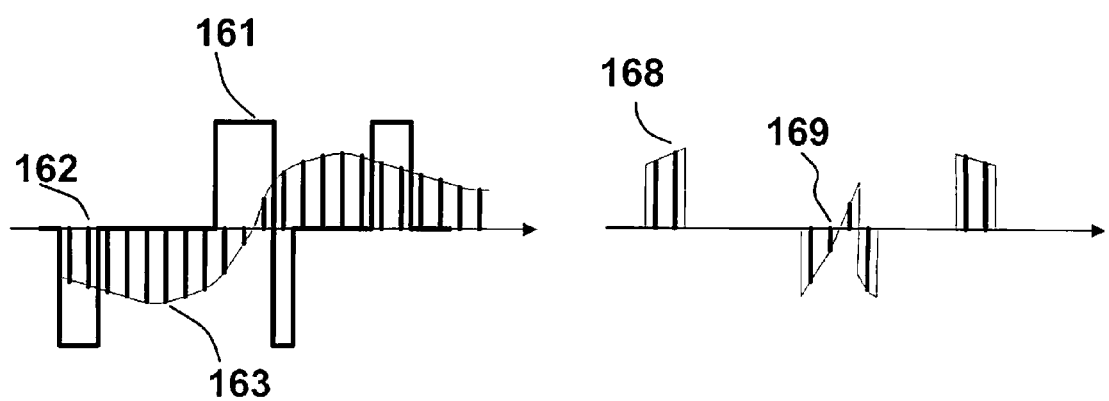
FIG. 4E shows two signals that are multiplied together, but does so more in accordance with today's digital methods.
FIG. 4F shows the result of the multiply of the two signals shown in FIG. 4E.

FIG. 4E shows, again, two signals that are multiplied together, but does so more in accordance with today's digital methods. Using today's digital signal processing techniques, the code signal is typically sampled by an A/D and FIG. 4E shows such samples as discrete vertical lines following the envelope of the original continuous signal. Sampling is typically periodic at some sample frequency $f_s$. Again, during a multiply, the track reference signal 161 acts as an enable, passing only samples such as 162 that are within its non-zero region of support. Samples taken outside the region of support, such as the sample at 163, are discarded.

FIG. 4F shows the result of the multiply of the two signals shown in FIG. 4E. Digital samples remain only at the regions of support of the track reference signal. Some are inverted, such as the sample 168 while others, such as the sample 169 remain unchanged in sign. The scaling of the multiply is preferably (though not necessarily) left at unity in order to reduce computational overhead. As such, the track reference signal simply acts as an enable, allowing the desired samples to pass to an accumulator, perhaps with inverted sign.

The final step in correlation is the accumulation (or summation) of the samples that were enabled by the multiply. This accumulation occurs over some prescribed correlation time-window, at which point the accumulation is latched and a new accumulation begins. The length of time may correspond to the length of a repeating code such as the GPS C/A code, but this is not necessary.

When performing correlations on a digitally sampled signal, summations are use rather than the integrations that would be used when performing correlations on the original continuous-time signal. The summation produces results similar to those obtained by integrating the original continuous-time signal provided certain conditions are met. One condition is that the sample rate, $f_s$, should be sufficiently fast to satisfy Nyquist requirements. Another condition is that the samples should be distributed, on average, uniformly within the correlation kernels of the track reference signal. Generally, this implies a sufficiently large number of samples in order to meet statistical requirements for uniformity. A track reference signal, such as described in this patent, has repeating, identically shaped correlation kernels aligned to a fundamental frequency, $f_{chip}$. High repetition of such correlation kernels helps to assure the statistical assumption of a uniform distribution. Proper selection of the sample frequency is also beneficial in this regard. If the ratio of sample frequency $f_s$, to the chip frequency, $f_{chip}$ is irrational, it reduces the likelihood that the location of the first sample within any correlation kernel will repeat at a subsequent correlation kernel.

The remainder of the figures within this patent will deal only with a continuous-time representation of the various signals used in the correlation such as those shown in FIG. 4C. This is for simplicity of presentation. It is understood, by those skilled in the art, that the continuous-time representation is easily translated into a digital implementation.

Figure 5:
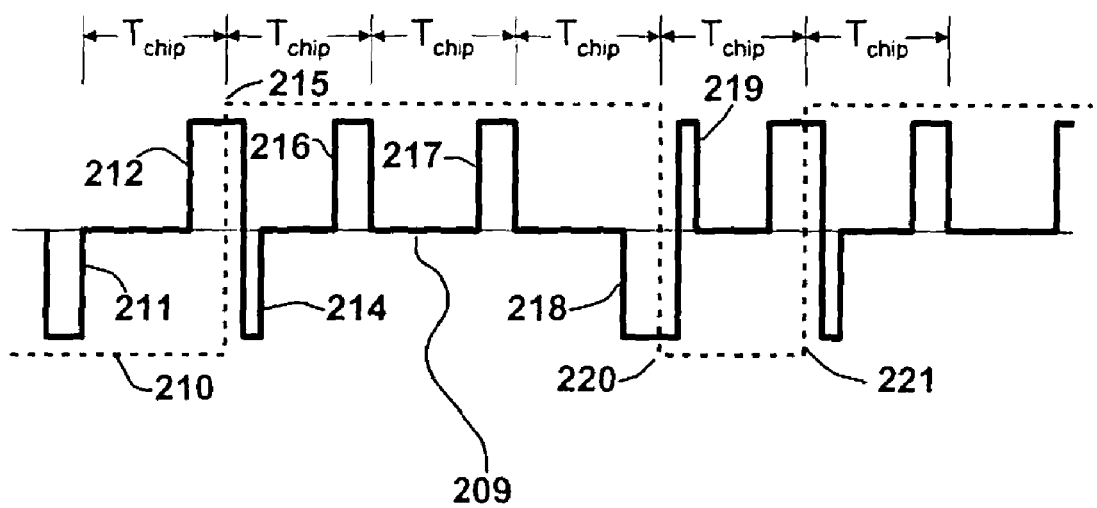
FIG. 5 shows a track reference signal consisting of a series of correlation kernels, themselves made up of individual pulses. The track reference is shown phase-aligned to the code signal.

FIG. 5 shows a track reference signal, 209, that consists of a series of correlation kernels, themselves made up of individual pulses. The track signal, 209 is shown aligned to the code signal 210 with zero phase error. By this we mean that the phase of the track reference signal is defined to exactly align with the phase of the code signal 210 in the position shown.

In FIG. 5, the width of each code chip is shown to be of duration $T_{chip}$. The code signal 210 is seen to change sign three times at chip boundaries 215, 220 and 221. A Low-High Transition (L-H Transition) in sign occurs at 215 and 221 and a High-Low Transition (H-L Transition) in sign occurs at 220. Following the chip boundary 215, the code remains high for three consecutive chips. It then goes low for one chip and back high for two more chips. Many combinations H-L, L-H and non-transitions of chips will arise in practice.

The design of the track reference signal, 209, involves knowledge of the code signal 210. In one embodiment of the present invention, the correlation kernels of the track reference signal consists of high and low pulses at appropriate times relative to the code signal, generally near the code signal's chip boundaries. At non-transitions of the code signal, the correlation kernels, such as 211, 216, and 217 occur for a short duration near the end of the chip. The pulses comprising the correlation kernel take the same sign as the code chip, positive when the code is positive and negative when the code is negative.

The correlation kernels take a different characteristic at L-H and H-L transitions of the code. On L-H transitions such as 215, the correlation kernel pulse 212 occurs prior to the L-H transition. The pulse 212 remains in effect until after the transition, at which point a pulse 214 of opposite sign occurs. The first pulse, 212, takes the sign of the code chip immediately following the transition 215, thus 212 is positive.

On H-L transitions of the code such as 220, the pulses of the correlation kernel reverse sign. That is pulse 218 is negative to match the sign of the upcoming code chip. Following pulse 218, the pulse 219 occurs with a sign flipped back to positive.

In another embodiment of the present invention, all signs of the track reference signal 209 could be reversed relative to the code. The end result is that the error discriminator will reverse, and the tracking loop that drives the phase of the track reference phase will then need to flip the sign back to give the correct feedback.

The track reference signal depicted in FIG. 5 could be modified regarding placement, number, and size of the correlation kernels and still maintain the desired properties brought forth in this patent. The scope and impact of such modifications will become clear by subsequent teachings of this patent.

Figure 6A:
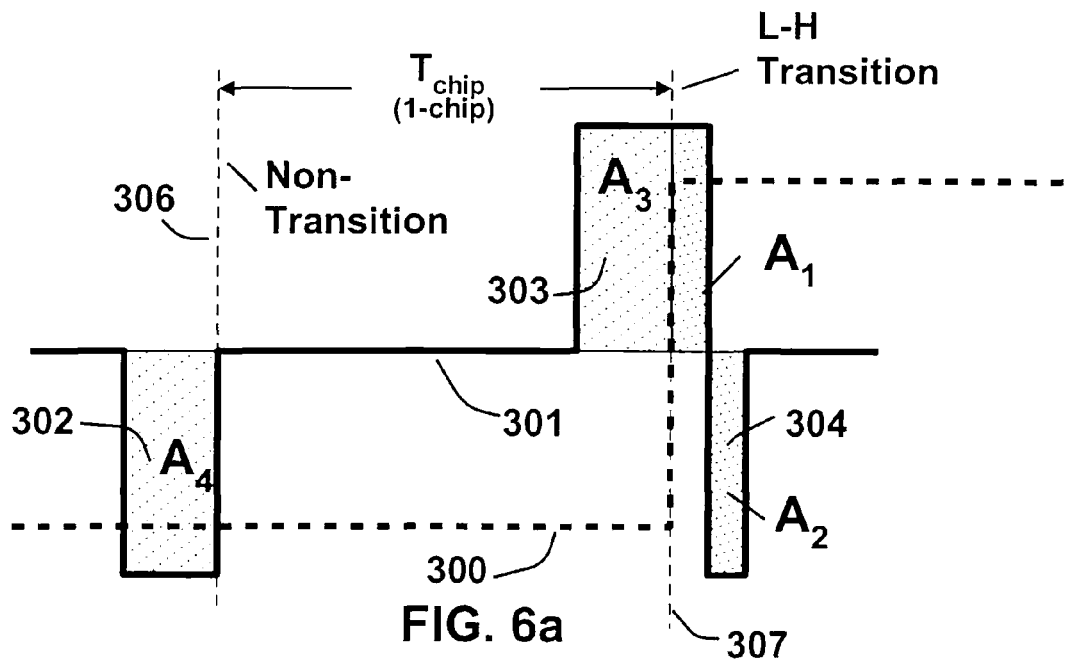
FIG. 6A shows track reference signal containing a Non-Transition correlation kernel and a Low-High (L-H) transition correlation kernel as per one embodiment of the present invention.
Figure 6B:
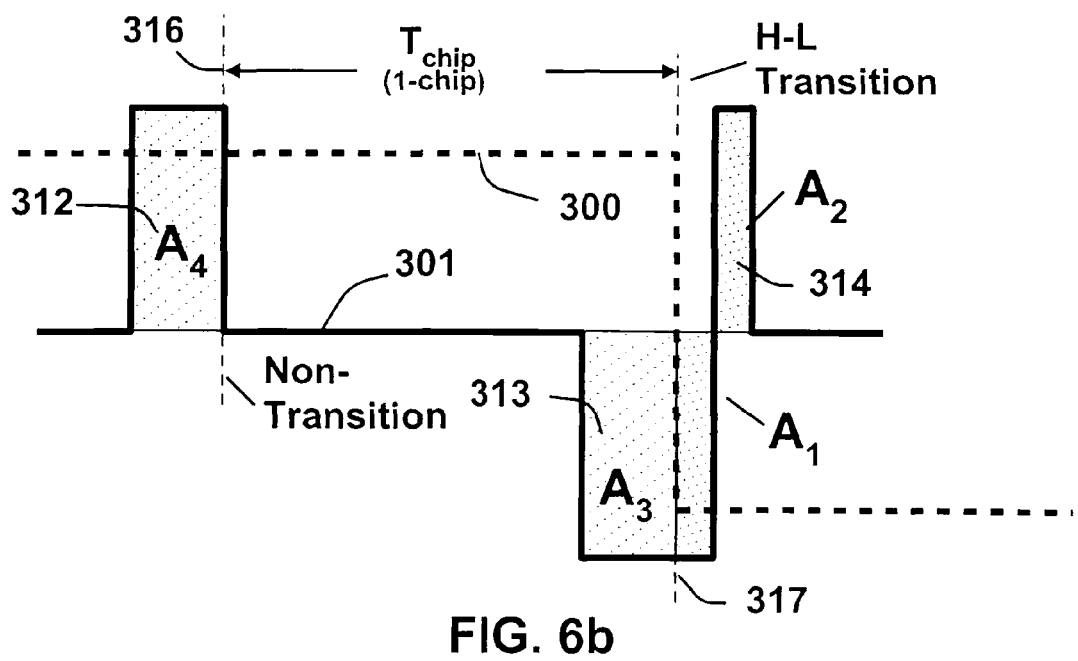
FIG. 6B shows track reference signal containing a Non-Transition correlation kernel and a High-Low (H-L) transition correlation kernel as per one embodiment of the present invention.

FIG. 6A and FIG. 6B give further explanation as to the shape of the correlation kernels. The code signal, 300 is shown in both FIG. 6A and FIG. 6B, undergoing a L-H transition 307 in FIG. 6A and a H-L transition 317 in FIG. 6B.

Referring to FIG. 6A, the track reference signal 301 is shown to contain Non-Transition correlation kernel 302, and a L-H transition correlation kernel consisting of pulses 303, and 304. The code takes a L-H transition coincident with pulse 303, dividing it into two regions, one having an area $A_1$ and the having an area $A_3$. Pulse 302, having an area $A_4$, is shown aligned to the end of a non-transition code chip (one for which the sign does not change in the next chip). Pulse 304 of area $A_2$ follows pulse 303 and is of opposite sign.

When the track signal 301 is aligned in phase to the code signal 300, the area $A_1$ is equal to $A_2$ and the area $A_3$ is equal to $A_4$. We henceforth refer to this equalization as a mass balance, borrowing from the terminology one might use if the areas depicted were actually plates of material having equal thickness and composition.

Referring to FIG. 6B, we depict the code having opposite transition and non-transition signs relative those shown in FIG. 6A. Consequently the pulses 312, 313, and 314 of the correlation kernel are reversed relative to pulses 302, 303, and 304. Again, the area $A_1$ is balanced to $A_2$ and the area $A_3$ is balanced to $A_4$ when the phase of the track reference signal matches that of the code signal.

The track reference signal 301 acts as a multiplier and enable for the code signal 300. The product is zero wherever the track reference signal 301 is zero, and non-zero wherever the correlation kernels exist. The non-zero portion has an amplitude that is the product of both the amplitude of the code and the amplitude of the track reference, including sign. For example, if the code signal amplitude is −0.5 and track reference signal amplitude is −1, the product is of amplitude +0.5.

Figure 7A:
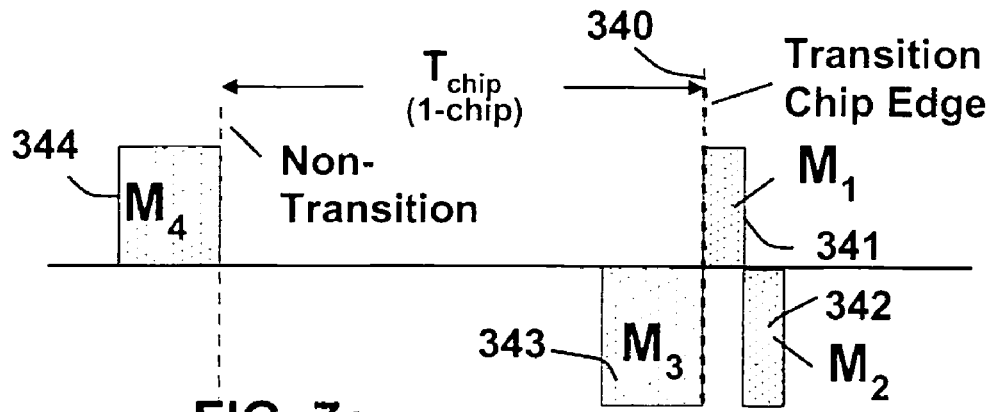
FIG. 7A shows the non-zero regions that occur after a non-transition correlation kernel and a L-H correlation kernel multiply a code signal. The areas of these regions are referred to as masses, and for this figure a mass balance exist since masses sum to zero.

FIG. 7A shows the product of the track reference signal and the code signal when both are phase aligned. The product pulses 341, 342, 343 and 344 have areas $M_1$, $M_2$, $M_3$ and $M_4$ respectively and we will refer to such product pulses as masses. The areas of these masses are proportional to the corresponding areas $A_1$, $A_2$, $A_3$ and $A_4$ of the track reference signal, but are scaled in amplitude by the height of the code signal. The masses also contain some sign reversals relative to the original pulses due to multiplication by the code signal. Sign reversals occur whenever the code is negative. A change in sign of the code occurs at the chip level transition 340.

FIG. 7A holds for both L-H transitions, and H-L transitions. That is, regardless of the direction of the code transition (H-L or L-H), $M_2$ and $M_3$ are negative while $M_1$ and $M_4$ are positive. This is by design.

A further property of the invention relates to the areas of $M_1$, $M_2$, $M_3$ and $M_4$. When the track reference signal and the code signal are aligned in phase, the areas cancel to zero when summed together. Specifically $$M_2 = -M_1$$

and $$M_3 = -M_4$$

and so, $$M_1 + M_2 + M_3 + M_4 = 0$$

Thus, the track reference signal is mass-balanced about to the code signal so as to yield a zero summation.

Figure 7B:
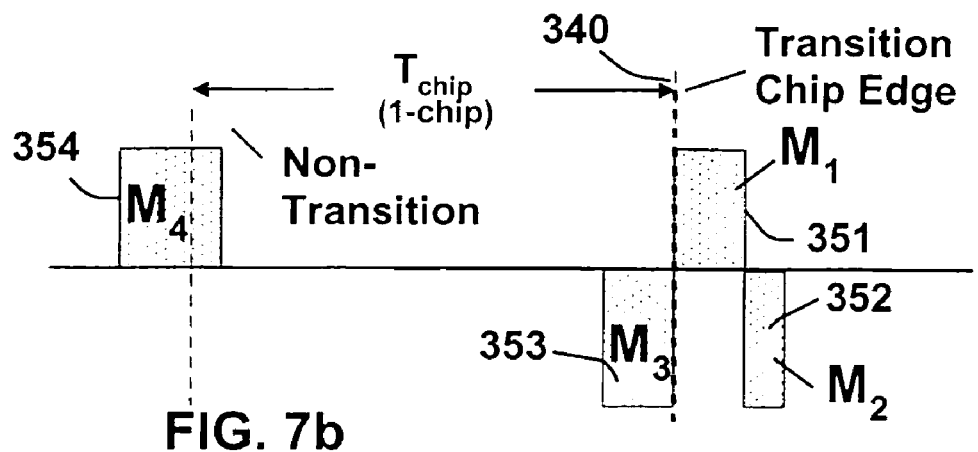
FIG. 7B shows the result of shifting the track reference signal so that its phase lags the code signal.

FIG. 7B shows the result of delaying the track reference signal relative to the code by a positive phase offset. That is, the track reference signal lags the code signal. The masses 351, 352, 353 and 354 of the track signal are seen to shift right relative to the code's level transition 340. The mass 351 gains positive area so that $M_1$ increases by a positive amount. The mass 353 loses negative area, so that $M_3$ also effectively increases by a positive amount. Thus, there is a net positive increase in mass (or correlation) relative to FIG. 7A. Precisely, $$M_1 + M_2 + M_3 + M_4 = 2 \times \delta$$

Where $\delta$ is the increase in the area of $M_1$ and also the increase in area of $M_3$.

Figure 7C:
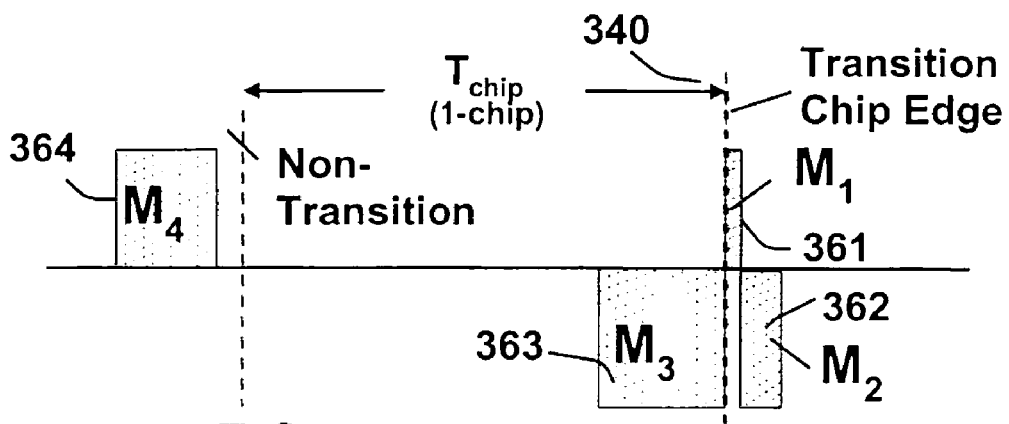
FIG. 7C shows the result of shifting the track reference signal so that its phase leads the code signal.

FIG. 7C shows the case when the track reference signal leads the code signal. The pulses 361, 362, 363 and 364 are seen to shift left relative to the code sign transition 340. The mass 361 loses positive area so that $M_1$ decreases in value. The mass 363 gains negative area, so that $M_3$ also decreases. Thus, there is a net decrease in mass relative to FIG. 7A. Precisely, $$M_1 + M_2 + M_3 + M_4 = -2 \times \delta$$

Where is $\delta$ the decrease in area of both $M_1$ and $M_3$.

The mass summations represent the process of computing a correlation between the track-reference signal and the code signal. The correlation acts as a measure phase error between the track reference signal and the code signal. Specifically, the sum of all masses, M, across all chips gives a result that is proportional to phase error for small phase errors. We therefore refer to this correlation as a correlative-phase-discriminator.

Figure 8A:
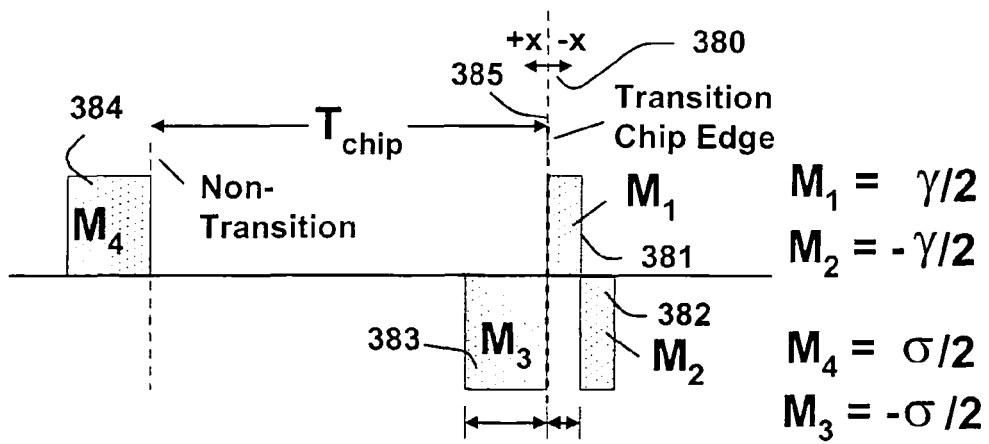
FIG. 8A shows the arrangement of masses at a transitions and a non-transitions and also shows the phase error 'x' relative to these masses.

Referring to FIG. 8A, the chip transition, 385, acts as the zero-phase reference. Phase error is thus measured by a displacement 'x', 380, relative to zero. Positive 'x' is taken so the code signal leads the track reference signal. At zero phase error (x=0), the masses 381, 382, 383, and 384 balance. For some positive constants $\gamma$ and $\sigma$, the relationship is $$M_1 = \gamma/2$$

$$M_2 = -\gamma/2$$

$$M_3 = \sigma/2$$

$$M_4 = -\sigma/2$$

So that $M_1 + M_2 + M_3 + M_4 = 0$

Figure 8B:
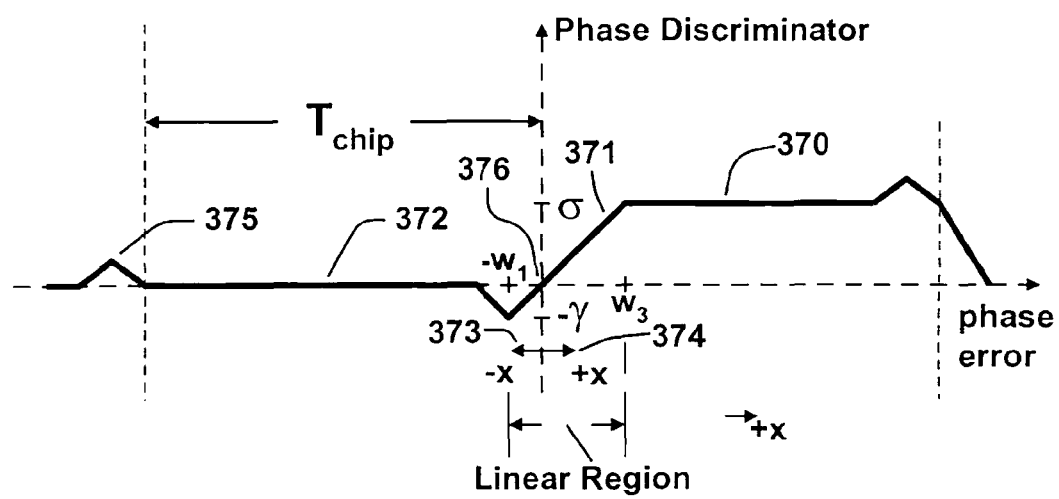
FIG. 8B shows the resulting correlative-phase-discriminator curve as a function of true phase error.

FIG. 8B shows a plot of the correlative-phase-discriminator as a function of true phase error 'x' for a phase error of x=+1 to x=−1 chip. The phase error x, is shown in the positive sense 374, and the negative sense 373. Notice that, as stated, the point of zero phase error gives a zero mass balance and hence zero phase discriminator 376. The phase discriminator curve 371 for small phase errors is of constant slope (linear)

and is positive for positive phase error (code phase leading reference phase). It reaches a maximum of σ on the right-hand end of the linear region, at a phase error of $w_3$—the width of the $M_3$ pulse at zero phase error. As true phase error continues in the positive direction, the correlative-phase-discriminator levels off to a constant value as shown by 370. Similarly, moving left, it reaches a peak negative value of $-\gamma$ at a phase error of $-w_1$ and then slopes back to zero as phase error becomes more negative, reaching zero at $-2w_1$. The correlative-phase-discriminator becomes zero over the region 372 with a slight bump 375 outside of a phase error of −1 chip. Due to its derivation from the mass-balance concept, we refer to this as a mass-balance correlative-phase-discriminator.

Employing the correlative-phase-discriminator as a measure of phase error, conventional linear control techniques can be utilized to maintain near zero phase error. During tracking, the phase error will typically reside within the linear portion 371, and linear control assumptions hold true. Even larger positive phase errors, up to one chip in duration, are zeroed out by a feedback control loop since the phase discriminator remains non-zero and positive when phase error is positive. However, due to the asymmetric nature of the mass-balance phase discriminator curve, reverse is not true. If phase error exceeds a value of $-2w_1$, the phase discriminator goes to zero, 372, where it remains for negative phase errors up to −1 chip. In the region 372, the feedback control will not be able to zero out the phase error. A solution for this problem, however, is disclosed subsequently.

In the disclosure presented thus far, an important point has been overlooked. The phase discriminator is calculated by correlating over a period of time that includes many code chips, some with transitions in sign and some without. There is no guarantee that the number of transitions will be equal to the number of non transitions. If the mass balance is to produce the desired results, then this mismatch of level transitions to non-transitions must be taken into account.

Referring again to FIG. 8A, recall the mass $M_3$ at the sign transition must balance the mass $M_4$ at the non-transition whenever the track reference signal and code signal are aligned. But taking into account all chips within the code sequence the mass balance becomes $$N_T \times M_1 + N_T \times M_2 = 0$$

and $$N_T \times M_3 + N_N \times M_4 = 0 \text{ (only if } N_T \times M_3 = -N_N \times M_4)$$

where $N_T$ is the number of sign transitions (both L-H and H-L), and $N_N$ is the number of non-transitions.

But simply having $M_2 = -M_1$ and $M_3 = -M_4$ non longer produces a zero mass balance unless $N_N = N_T$.

We thus introduce a scale factor α for which the final correlation of all non-transitions is multiplied. We compute α as $$\alpha = (N_T \times |M_3|)/(N_N \times |M_4|)$$

When $|M_3| = |M_4|$, which is the case described so far and also convenient for implementation then $$\alpha = N_T/N_N$$

The mass balance then becomes $$N_T \times M_1 + N_T \times M_2 = 0$$

and $$N_T \times M_3 + \alpha \times N_N \times M_4 = 0$$

which indeed holds true for any nonzero $N_N$ and $N_T$.

Generally, many arrangements of scaling the transition correlation to the non-transition correlation are possible. For example, choose any numbers $\beta_1$ and $\beta_2$ such that $$\beta_2/\beta_1 = \alpha$$

And then multiply the transition correlation by β1 and the non-transition correlation by β2 to satisfy the mass balance. This will give a mass balance $$\beta_1 \times (N_T \times M_1 + N_T \times M_2) = 0$$

and $$\beta_1 \times N_T \times M_3 + \beta_2 \times N_N \times M_4 = 0$$

In summary, to produce a correlative-phase-discriminator per this invention that is unbiased and gives a zero value for zero phase error, two correlations must be performed and summed together with appropriate scaling. One correlation involving all code sign transitions (L-H and H-L) and the other involving all non-transitions. There is at least one work-around, but it is less desirable. The work-around would be to move the mass $M_4$ to the lie within a transition chip and perform correlations only on transition chips.

The need for two correlations may not seem necessary to those who are familiar with the GPS C/A gold code, and who incorrectly assume that the number of transitions to non-transitions is balanced for each C/A code.

The table of FIG. 9 illustrates the point. This table provides the totals of the chip-edge events that occur within the C/A code of GPS.

As mentioned, the need for two correlations stems form the fact that the invention disclosed here correlates data from both transition and non-transition chips, and these chips do not necessarily equal in number of occurrence. The advantage of the present invention is that it gives rise to a mass-balance phase discriminator as shown FIG. 8B. One benefit of such a discriminator is that for positive phase errors (code signal leading the track reference signal) up to one full chip in magnitude, a control loop using the discriminator as a measure of phase error will have feedback of the correct sign to drive the phase error to zero. This is not true for negative phase errors (code signal lagging) due to the zero-region 372 which provides no discriminator feedback for phase errors that are more negative $-2w_1$. Phase error will, however, able when $>-2w_1$.

Figure 10A:
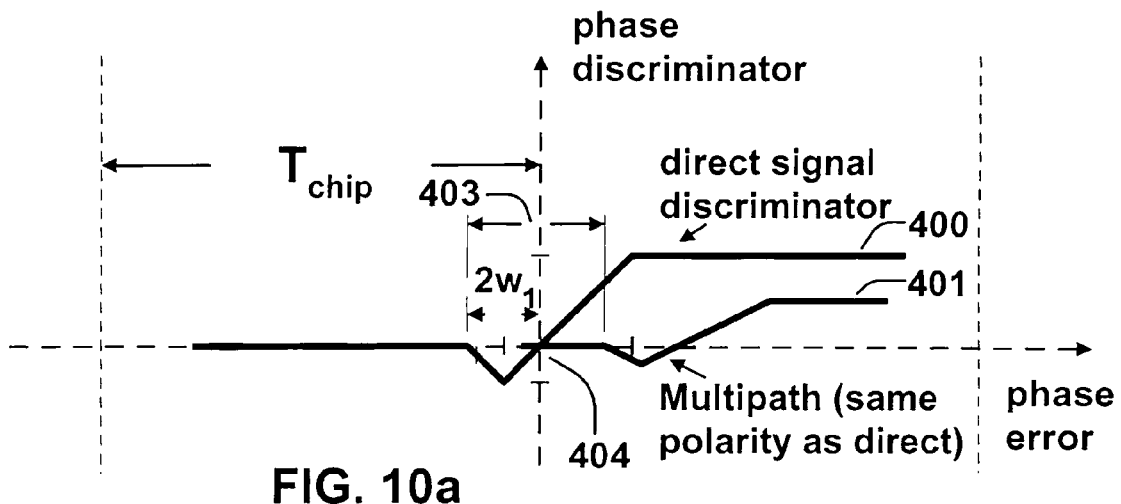
FIGS. 10A and 10B show direct and multipath error signals superimposed on one another, for the purpose of showing the multipath reducing benefit of the invention.
Figure 10B:
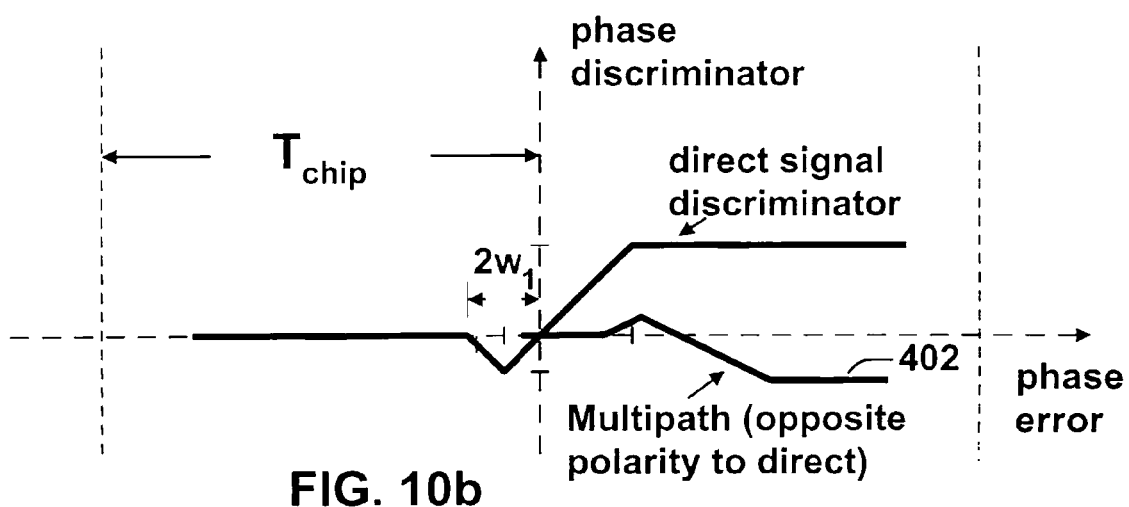

The mass-balance phase discriminator curve, having a zero region in the left-half, is beneficial for reducing multipath. This is shown in FIG. 10 where the phase discriminator curve 400 for the code signal is shown along with phase discriminator curves 401 and 402 that result from signals that are similar to the code, but delayed in time such as is the case of multipath. Multipath is always delayed with respect to the direct signal and thus the offset 403 of the multipath delayed discriminators is always to the right of zero. The delayed discriminator 401 in FIG. 10A is a result of a delayed code multipath signal having the same polarity as the direct signal, but it is equally likely that the multipath will be of opposite polarity to the direct signal as shown by 402 of FIG. 10B. Since multipath enters the system linearly, superposition holds. That is, the total correlative-phase-discriminator is the sum of phase discriminator 400 from the direct signal and the discriminator 401 or 401 from the multipath signal. When the multipath signal is delayed by more than the duration of $2w_1$ it no longer has an effect on the zero crossing point 404 of the direct signal's discriminator curve when summed with the delayed discriminator. The adverse effects of the multipath on the summed discriminator zero crossing are thus eliminated for multipath delayed by more than $2w_1$.

The benefit of reducing multipath can be achieved by building an mass-balance phase discriminator choosing areas as outlined in FIG. 7. That is $$M_2 = -M_1$$

and $$M_3 = -M_4$$

Although the pulses of the track-reference signal shown thus far have all been rectangular, they need not be. The pulses of the track-reference signal can have rounded tops or tops with various curvatures so long as their areas satisfy the mass balance and sign conventions introduced. When processing digital samples, curvature on the top of the pulses amounts to different weightings on samples.

Figure 11A:
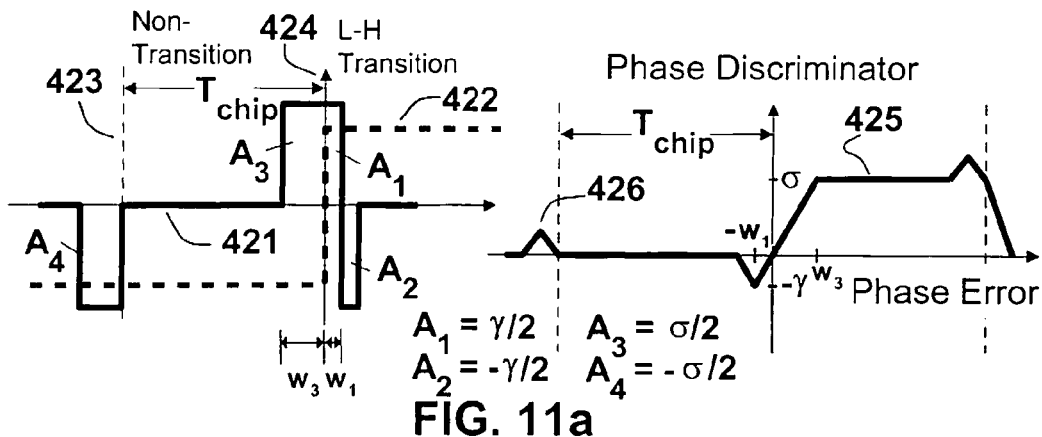
FIG. 11A through FIG. 11C show three different implementations of non-transition correlation kernels. On the right, the corresponding phase discriminators are shown.
Figure 11B:
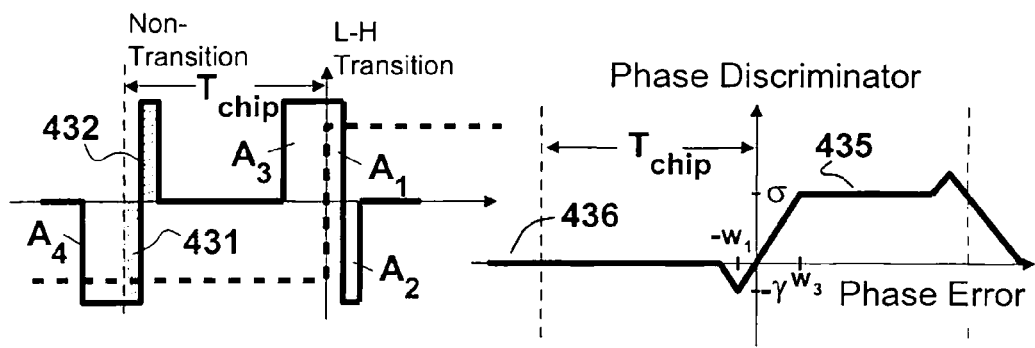
Figure 11C:
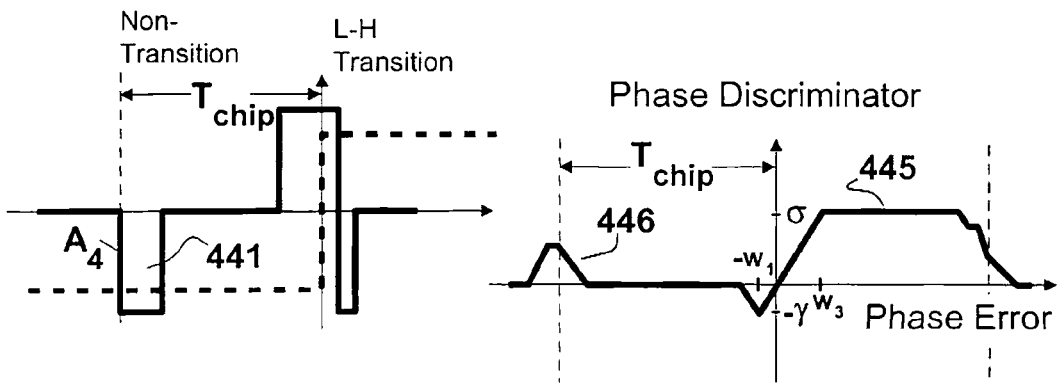

It is also possible to modify the correlation kernels track-reference signal without affecting the mass balance provided that the modifications follow certain rules. For example, additional pulses may be added to the correlation kernel provided the pulses result in masses that cancel one another at zero phase error. And it is possible move the locations of the correlation kernel somewhat without affecting the mass balance. FIG. 11A through FIG. 11C show some rearrangements of the area corresponding to a non-transition chip. In the left-hand side of FIG. 11A, a code signal 422 is shown for which there is a non-transition 423 and an L-H transition 424. The correlation kernels of the track reference signal 421 are depicted according to one embodiment of the present invention. The corresponding discriminator curve 425 is shown to the right. Note the small hump 426 lying just outside on chip of negative phase error.

FIG. 11B depicts another embodiment of the present invention where a modification to the correlation kernel at the non-transition has been made by adding two pulses of canceling area. The pulse 431 and 432 are shown with equal area and opposite sign. In fact, the arrangements of the pulses at the transition and at the non-transition are now similar, and as such, the track-reference signal shown in FIG. 11B may be simpler to implement than the one shown in FIG. 11A. The corresponding phase discriminator 435 is also shown in FIG. 11B where is evident that the hump that was present in FIG. 11A is no longer present. Hence, there is a flatness of the discriminator at 436 and the discriminator remains at a zero value. The elimination of the hump may be advantageous in situations where multipath of approximately one chip delay is present.

In FIG. 11C, the correlation kernel pulse 441 of area A4 has been delayed (shifted right) so that it occurs immediately following a non-transition chip boundary, rather than before the boundary. The mass balance is still satisfied, but a change occurs in the corresponding phase discriminator 445. The hump 446 now appears larger than in FIG. 11A and has moved within one chip's distance of the point of zero phase error. The hump 446 may be disadvantageous when experiencing multipath arriving approximately one-chip delayed relative to the direct signal.

In addition to the aforementioned modifications to the correlation kernels and their areas, we note that correlation kernels corresponding to chip transitions can be changed in size relative to correlation kernels corresponding to non transitions, provided such changes are accounted for by the scale factors $\alpha$ or $\beta_1$ and $\beta_2$.

Kernels that satisfy the mass-balance across transition and non-transition chips will be referred to as mass-balance kernels. The correlative code-phase discriminator resulting from summing or accumulating these kernels will be referred to as the mass-balance discriminator.

Figure 12:
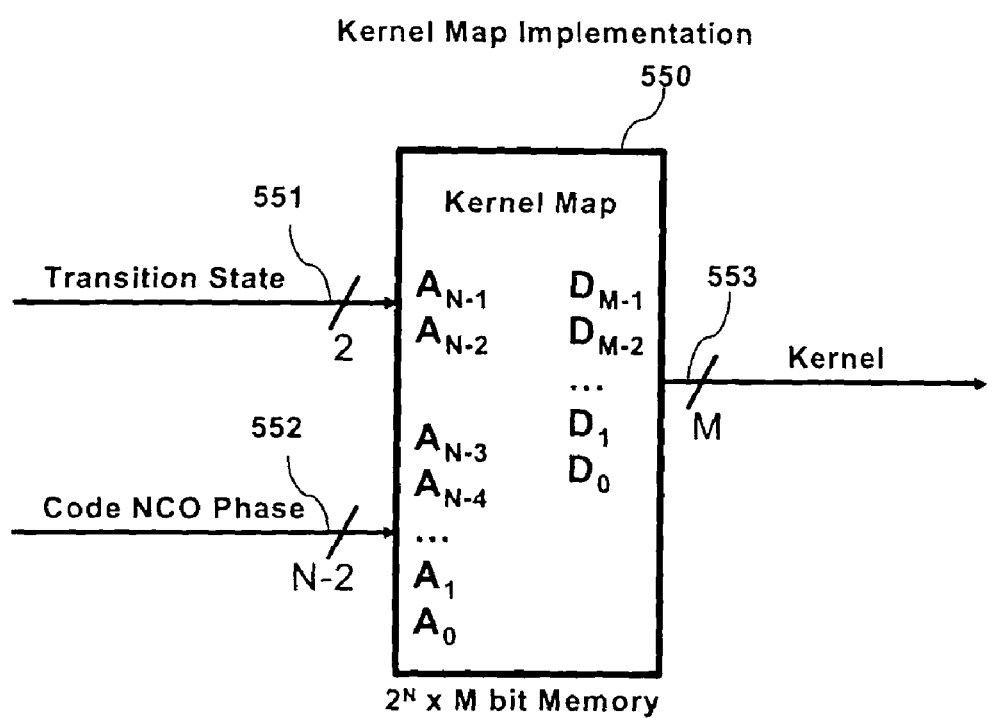
FIG. 12 shows a correlation kernel memory map implementation.

FIG. 12 shows one possible implementation of the invention utilizing a $2^N$ by M bit memory 550 to build the kernel. The N bit address, $A_{N-1} \ldots A_o$, consists of a 2 bit transition state 551 and the upper N-2 bits of the code NCO 552. The M bit memory output 553, $D_{M-1} \ldots D_o$, consists of the kernel weight associated with the fractional code NCO phase and transition state. The 2 bit transition state, $A_{N-1}, A_{N-2}$, is defined as:

| $A_{N-1}, A_{N-2}$ Definition | |
|---|---|
| $A_{N-1}, A_{N-2}$ | Meaning |
| 0 | Non-Transition of code, but code chip low |
| 1 | Non-Transition of code, but code chip high |
| 2 | H-L code transition |
| 3 | L-H code transition |

The memory of FIG. 12 is referred to as the Kernel Map. This embodiment produces a highly flexible correlation kernel than can even compensate for channel distortion and perform PRN pulse filtering.

At the minimum, to account for the imbalance in transitions and non transitions, two correlations must be formed, one for transitions (H-L or L-H), and one for non-transitions. These will be termed, XTionSum and NoXTionSum respectively.

The XTionSum and NoXTionSum correlations used to form the mass-balance discriminator are obtained using the following steps:

1. Load the Kernel Map memory after a system reset.
2. Every sample clock update the Code NCO.
3. Form address bits $A_{N-1} \ldots A_o$ by concatenating the 2 bit state transition value and the upper N-2 bits of the fractional code NCO phase.
4. Read the Kernel Map memory to obtain the kernel weight.
5. Calculate Mass=kernel weight times the digitally sampled codes (note the digitally sampled code need-not not be pure and may contain artifacts as a result of noise or conversion to base-band).
6. With the transition state coding described above, the $A_{N-1}$ address bit is set when the NCO phase is within a code bit transition region. When the code phase is within a bit transition region, add Mass to the transition accumulator. XTionSum: otherwise add Mass to the non-transition accumulator. NoXTionSum.
7. At the end of the correlation accumulation period, usually at the end of each PRN epoch for GPS, copy the XTionSum and NoXTionSum values into registers XTionReg and NoXTionReg and then reset both XTionSum and NoXTionSum to zero. The XTionReg and NoXTionReg registers are used by the processor for subsequent processing of the Mass Balance discriminator.

Figure 13A:
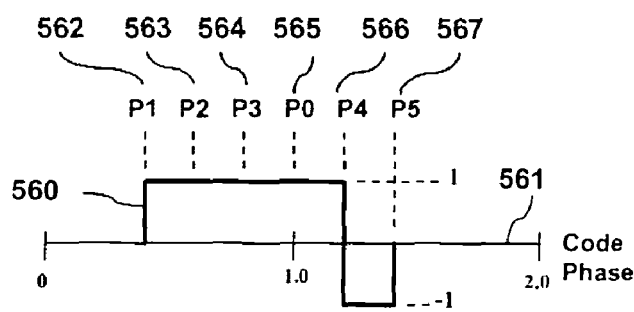
FIG. 13A shows an embodiment of transition correlation kernel mapped to total code phase.
Figure 13B:
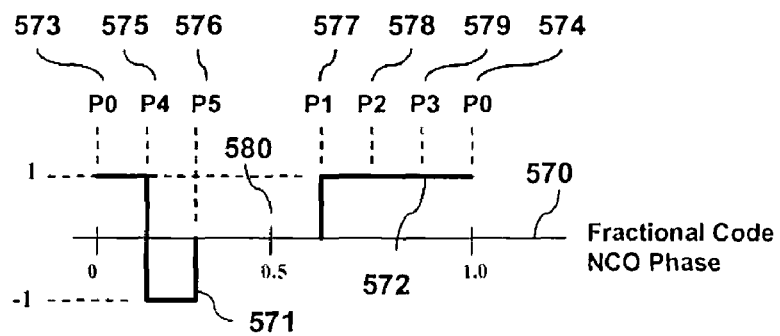
FIG. 13B shows an embodiment of transition correlation kernel mapped to fractional code phase.
Figure 14A:
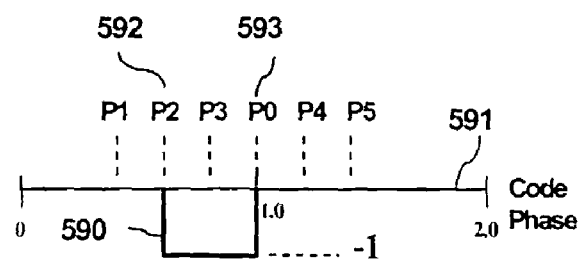
FIG. 14A shows an embodiment of a non-transition correlation kernel mapped to total code phase.
Figure 14B:
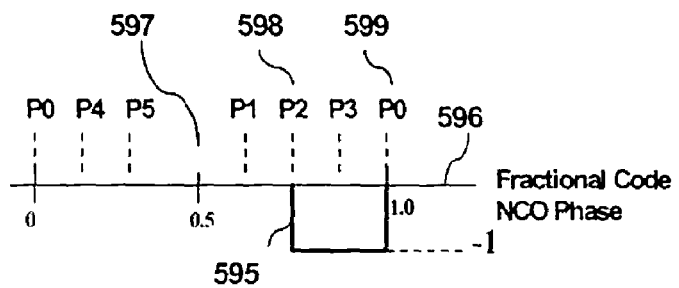
FIG. 14B shows an embodiment of non-transition correlation kernel mapped to fractional code phase.
Figure 15:
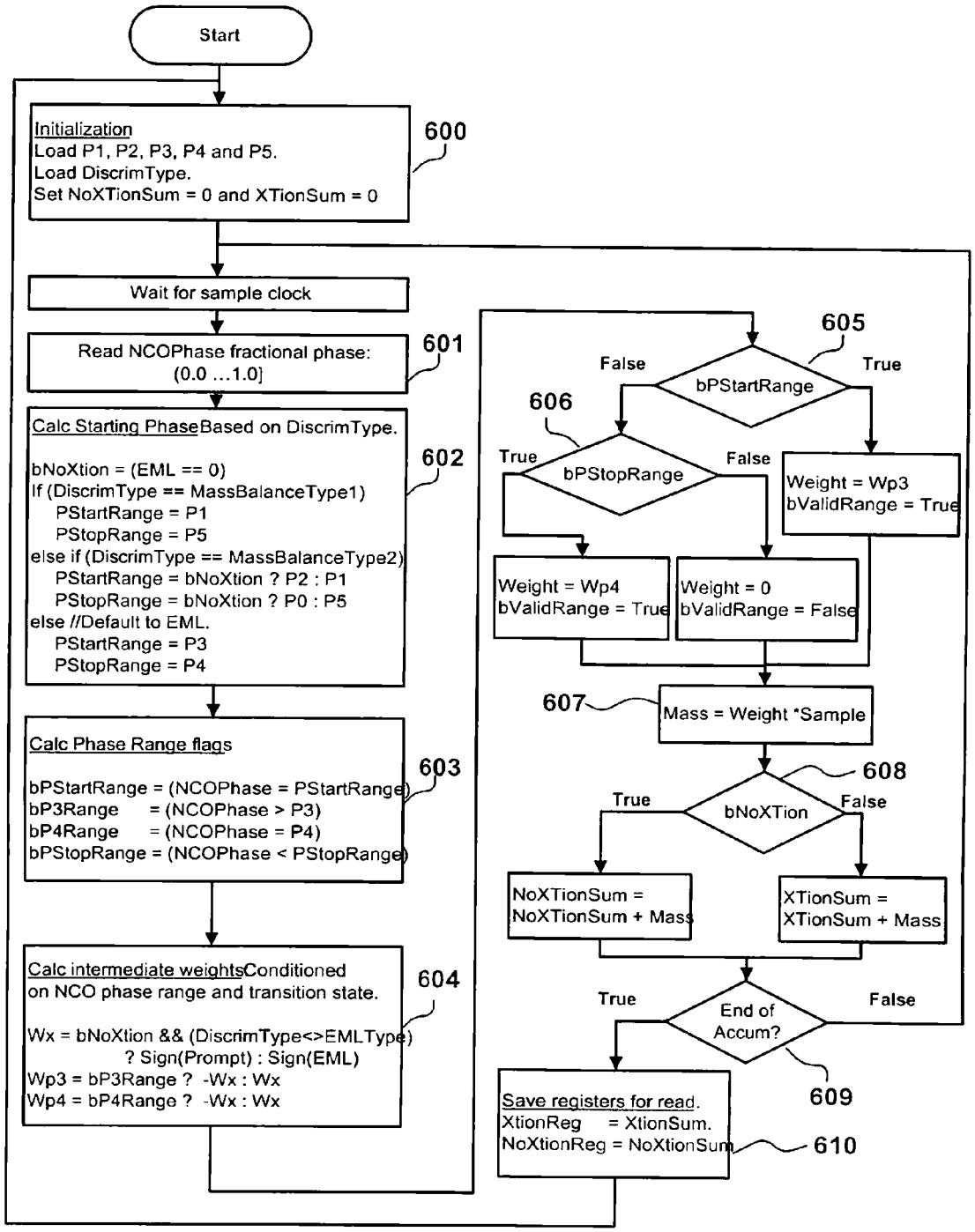
FIG. 15 is a flow chart showing the implementation Mass-Balance and EML Kernel Generator for one embodiment of the present invention.

The mass-balance transition and non-transition kernels described above as well as the EML kernel are simple kernels which can be efficiently implemented within combinational logic. The preferred embodiment compares the upper K bits of the fractional code NCO phase against programmable phase boundaries to form a wide range of kernels including the mass-balance kernels as well as the EML kernel. Note that the fractional NCO code phase ranges from 0 (inclusive) to 1.0 (exclusive); where 1.0 represents the next code bit. FIG. 13A and FIG. 13B illustrates how the transition kernel is mapped from the code phase to the fractional code phase. FIG. 14A and FIG. 14B illustrates the mapping for the non-transition kernel. FIG. 15 contains the algorithm implemented within the preferred embodiment.

The mass-balance transition kernel was originally presented in FIG. 6A 303 and 304. It is redrawn in FIG. 13A 560 to show how it is a function of the code phase 561. The kernel weights are determined by comparing the code phase against the phase boundaries P0 through P5 (565, 562, 563, 564, 566, and 567 respectively). The kernel is 0 at zero code phase and becomes 1 at code phase boundary 562 (P1). It remains 1 through code phase boundary 566 (P4). The kernel transitions to −1 at 566 (P4) and remains −1 until 567 (P5). The kernel transitions back to 0 at 567 (P5).

FIG. 13B maps the mass-balance transition kernel based upon the total code phase (560) into the fractional NCO code phase 570 between at 0 (inclusive) and 1.0 (exclusive). Within FIG. 13B, 571 and 572 represent the remapped kernel. Note that 573 and 574 both represent the same fractional code NCO phase of zero. Also, note that the kernel region of support does not include phase 580 (0.5), so 576<580 (P5<0.5) and 577 >580 (P1>0.5).

The mass-balance non-transition kernel was originally presented in FIG. 6A 302 and is redraw in FIG. 14A 590 as a function of the total code phase 591. The kernel starts at boundary 592 (P2) and stops at boundary P0. FIG. 14B maps the mass-balance non-transition kernel 592 into the fractional NCO code phase 596.

Note that by defining the six code phase boundaries, P0 through P5, many different kernels can be implemented within the same algorithm including the mass-balance kernels as well as the EML kernel. Recall that P0 always corresponds to zero fractional NCO code phase. Refer to FIG. 15 for the kernel generation algorithm used by the preferred embodiment.

The initialization step 600 occurs after every accumulation period and consists of reloading the phase boundaries, P1 through P5, the discriminator type (DiscrimType) and clearing the XTionSum and NoXTionSum correlation sums. The DiscrimType can take on many different values including MassBalanceType1, MassBalanceType2 and EMLType. MassBalanceType1 is associated with the kernels presented in FIG. 6A and FIG. 6B. MassBalanceType2 is associated with the mass-balance transition kernel for both transitions and non-transitions. EMLType is associated with the variable delay EML kernel.

At each sample clock the upper K bits of the code NCO are read into the variable NCOPhase as shown in step 601.

The starting phase range (PStartRange) and the stopping phase range (PStopRange) are determined conditioned upon DiscrimType and the transition state (bNoXtion) as shown in step 602. Statements of the form, a=c?x:y, are equivalent to "if c is true then a=x else a=y."

Boolean phase range flags are calculated as shown in step 603. The flags are set conditioned upon where the current fractional NCO code phase (NCOPhase) falls within the boundaries P1 through P5.

An intermediate kernel weight is calculated as shown in step 604. The intermediate weight is conditioned on the range flags in 603 and the transition state (bNoXtion). The sign(x) function returns +1 if x>0, −1 if x<0 and 0 if x=0. The final kernel value (weight) is set by 605 and 606.

The correlation mass is calculated in 607 where it is added to the appropriate correlation sum. NoXTionSum and XTionSum, based upon the transition state (bNoXtion) 608.

The accumulation period (or epoch) is checked 609 to see if it is complete. If the period is complete then the accumulation sums are stored in holding registers 610 for additional discriminator processing: otherwise, the process repeats at 601 following the next sample clock.

The mass-balance correlative-phase-discriminator, having a zero-region to the left, has been shown to be beneficial when measuring phase alignment between the track-reference signal and the code signal in the presence of delayed multipath signals. However, the mass-balance discriminator has the draw-back of not giving a measure of negative phase errors when those negative phase errors become large enough to fall within the zero-region. Such large errors may occur during the initial hand-off from acquisition of a code signal to the tracking of that code signal. As a means to allow for the detection and correction of large negative phase errors while tracking, dead-zone compensation may be added.

Figure 16:
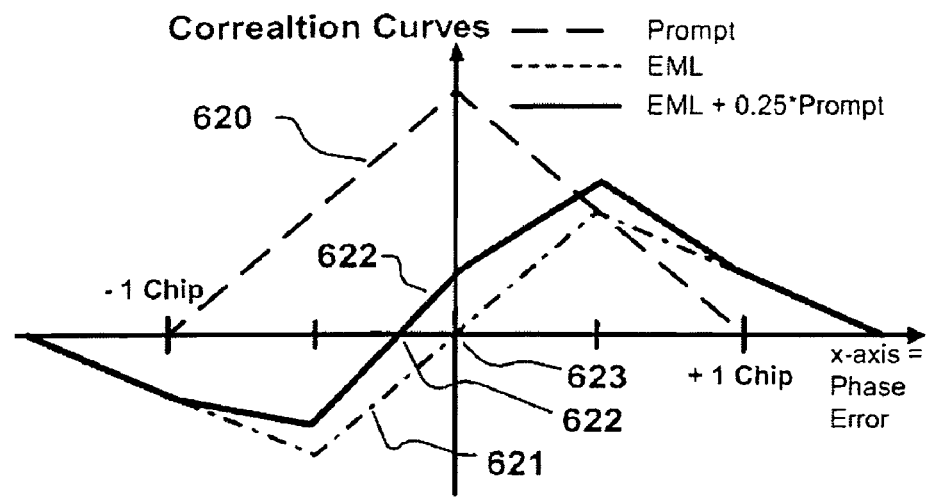
FIG. 16 shows a Prompt correlation, an Early-Minus-Late (EML) correlation and a "shifted EML" correlation.

FIG. 16 shows a Prompt correlation, 620, an Early-Minus-Late (EML) correlation, 621, and a "shifted EML" correlation 622 that is computed as 0.25×Prompt+EML. The EML correlation uses conventional one-half-chip early and one-half-chip late spacing and is computed as $$EML=\tfrac{1}{2}(Early-Late)$$

where "Early" is the correlation the code signal with a reference code signal shifted ½ chip early and "Late" is the correlation the code signal with a reference code signal shifted ½ chip late. "Prompt" is the on-time correlation of code and reference code. The ½ chip early/late spacing is not a requirement, other spacings would be permissible.

An important property of the shifted EML correlation is that it crosses the x-axis at 622 which is to the right of the zero phase error point 623.

Generally, the shifted EML correlation is of the form:

$$\text{Shifted EML correlation}=\eta\times Prompt+EML$$

where η is a positive or negative number.

Figure 17:
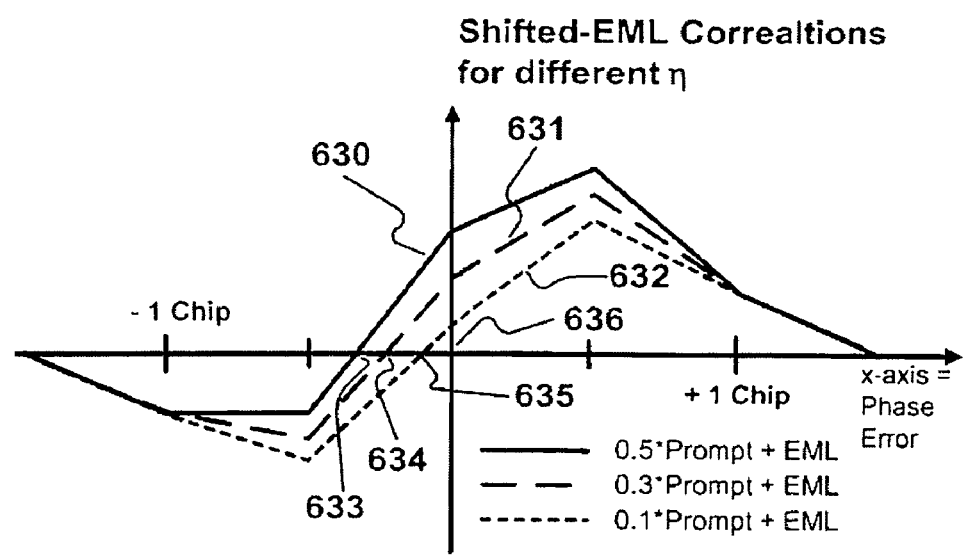
FIG. 17 shows three shifted EML correlation curves plotted as a function of code phase error.

FIG. 17 shows three shifted EML correlation curves 630, 631, and 632 plotted as a function of code phase error. The x-axis crossing points 633, 634, and 635 are controlled by the selection of the constant η. The smaller the value of η, the closer the x-axis crossing moves towards the point 636 of zero phase error. Three values of η are shown, specifically, η=0.5, η=0.3 and η=0.1.

The value of η is chosen as a compromise between keeping the correlation's x-axis crossing negative, but as close to the zero code-phase error point 633 as possible, and keeping it far enough to the left of this zero point to be tolerant of multipath-induced shifts. If the crossing shifts to the right of zero, it will introduce a tracking bias when utilizing the shifted EML correlation for dead-zone compensation in a code phase tracking loop.

Figure 18A:
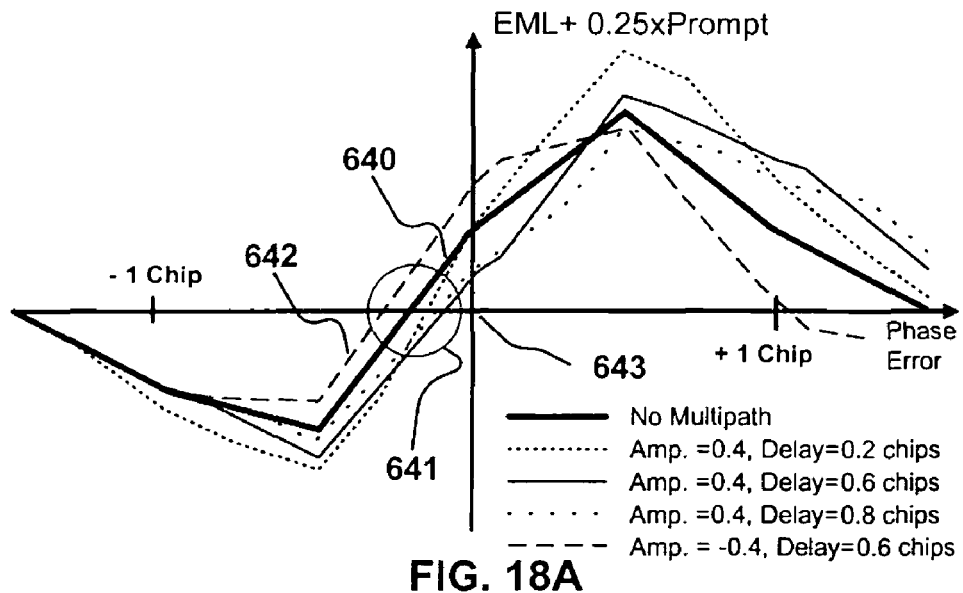
FIG. 18A provides various plots of shifted EML correlations. The shifted EML correlation is shown without multipath added and with the effects of several different multipath delays.

FIG. 18A provides various plots of a shifted EML correlation, all using η=0.25. The shifted EML correlation is shown without multipath added 640 and, for illustrative purposes, with the effects of several different multipath delays. In all cases, the amplitude of the multipath is taken as 0.4 times the amplitude of the direct signal. The shifted EML correlation 640, having been produced without multipath added, is shown to cross the x-axis to the left of zero code-phase error, 643, as do all the other correlations for which multipath has been added. All shifted EML correlations are seen to cross the x-axis within the circle 641, and all thus experience negative x-axis crossings as desired. Notice that the correlation 642 crosses the x-axis the left of the shifted EML correlation 640, while all other correlations cross to the right. This is a consequence of the fact that the correlation 642 corresponds to multipath having a sign that is opposite to the direct signal while the remaining correlations are for multipath of the same sign.

The shifted EML correlation may be used as dead-zone compensation for the mass-balance phase-discriminator disclosed here. With such compensation, a feedback control loop can remove code-phase errors that reside in the zero region 372 of FIG. 8B, whereas, with just the non-compensated mass-balance discriminator, the feedback control loop could not remove such code-phase errors.

The dead-zone compensation is performed by adding the negative portion of the shifted EML correlation to the mass-balance phase-discriminator. More specifically first compute the shifted EML correlation, and if negative, add it to the mass-balance phase-discriminator. This compensation effectively removes the zero-region on the left of the mass-balance discriminator, but does not affect the zero-crossing of the mass-balance discriminator. By design, the shifted EML correlation is tolerant of certain levels of multipath in the sense that, when added to the mass-balance discriminator, it will not alter the zero-crossing for multipath meeting the design conditions.

Figure 18B:
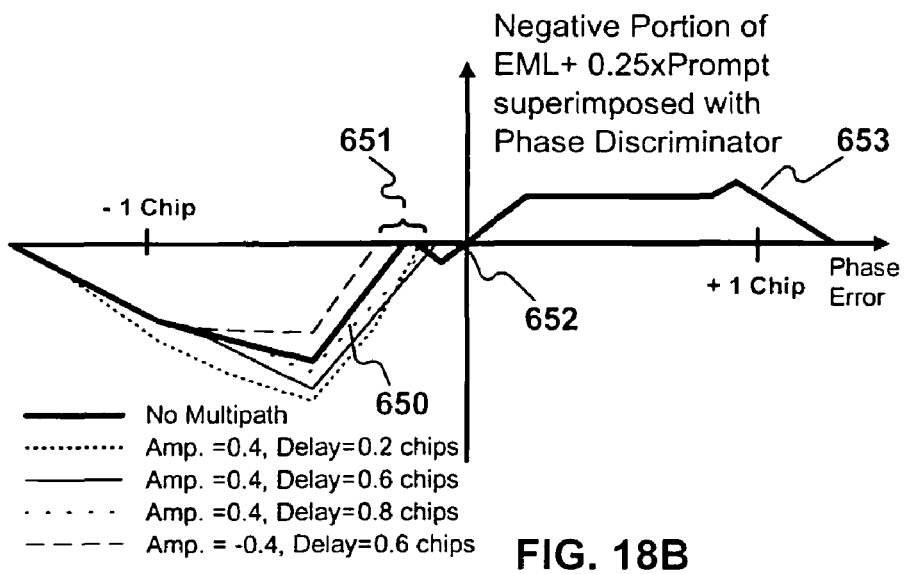
FIG. 18B, shows an mass-balance correlative-phase-discriminator as well as the negative portion of the shifted EML.

Referring to FIG. 18B, we see the mass-balance phase-discriminator 653 as well as the negative portion of the shifted EML 650. Additional shifted EML correlations are shown having distortions caused by multipath added to the direct signal as was presented in FIG. 14A. In spite of the multipath-induced distortions, all x-axis crossings 651 remain negative. Consequently, adding the negative portion of the shifted EML 650 to the mass-balance discriminator 653 will effectively result in a new discriminator that maintains its zero-crossing 652 at zero phase error, even in the presence of certain multipath. As mentioned, the benefit of this new discriminator is that negative phase errors of relatively large magnitude (less than a chip) can be detected and thus corrected, whereas with the original mass-balance phase-discriminator they could not.

The mass-balance correlative-phase-discriminator, compensated for dead zone, can be computed with the following simple steps:
 1. Compute the mass-balance correlative-phase-discriminator.
 2. Compute the shifted EML correlation=η×Prompt+EML.
 3. If the shifted EML correlation is negative, add it to mass-balance correlative-phase-discriminator.

Shifted EML's can also be utilized to contend with positive phase errors. This is accomplished by using a negative η and taking only the positive portion of the shifted EML correlation.

Figure 19A:
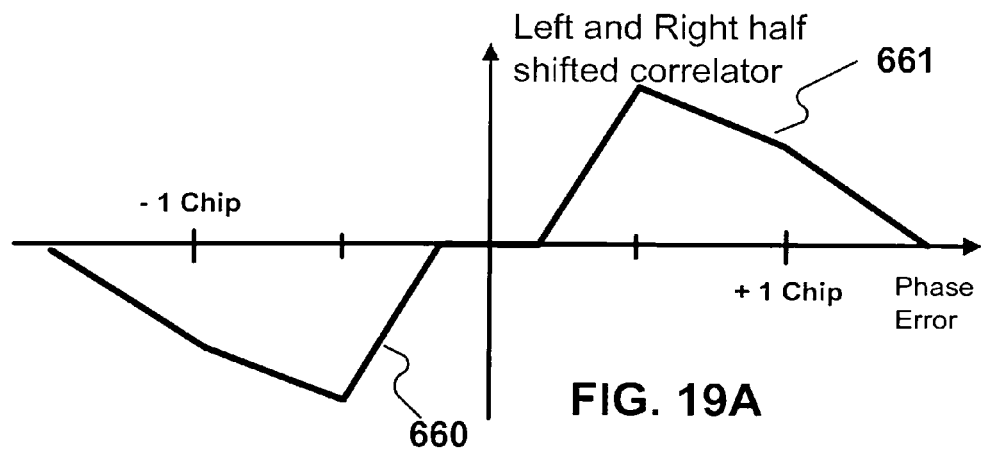
FIG. 19A shows left and right shifted EML correlations obtained using a positive and negative prompt correlation to obtain positive and negative shifts.

FIG. 19A shows left and right shifted EML correlations obtained using a positive and negative η, respectively. The left correlation curve, 660, obtained using positive η, has utilized only the negative portion of the shifted EML correlation. The right correlation curve 661 is just the opposite—computed with a negative η and only positive portion utilized. Both right and left correlations are biased away from zero so as to remain in their respective left- and right-half planes in the presence of multipath.

Figure 19B:
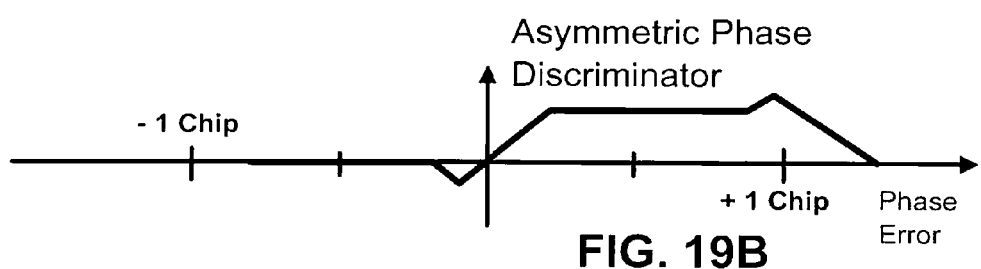
FIG. 19B shows the mass-balance phase-discriminator.
Figure 19C:
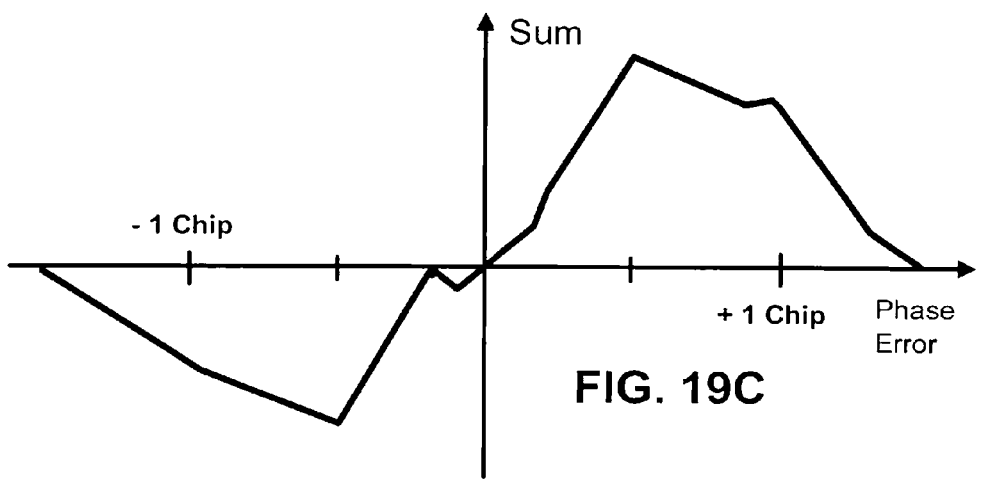
FIG. 19C shows the results of adding this discriminator to the shifted correlations of FIG. 19A.

FIG. 19B shows the mass-balance phase-discriminator, and FIG. 19C shows the results of adding this discriminator to the shifted correlations of FIG. 19A. The result is a combined discriminator that has the benefit of canceling out multipath in a manner similar to that of the original mass-balance phase-discriminator, but having an improved measure of larger code-phase errors. Specifically, the discriminator becomes large in magnitude as phase-error becomes large in magnitude. Of particular benefit is that the dead zone of the mass-balance discriminator is eliminated or nearly eliminated. Furthermore, such a discriminator can be applied immediately following the acquisition mode of a tracking system, the feedback of such discriminator resulting in rapid pull-in of large errors by a feedback control loop.

The steps corresponding to FIG. 19A through FIG. 19C are:
 1. Compute mass-balance correlative-phase-discriminator.
 2. Compute a first shifted EML correlation=η×Prompt+EML.
 3. If first shifted EML correlation is negative, add it to the mass-balance correlative-phase-discriminator.
 4. Compute a second shifted EML correlation=−η×Prompt+EML.
 5. If second shifted EML correlation is positive, add it to the mass-balance correlative-phase-discriminator.

The method of circumventing a dead-zone in phase discriminator, or widening a pull-in region using a shifted EML can be applied to virtually any correlative-phase-discriminator in the art today, not just the mass-balance discriminators described in this patent. The method is especially relevant to those correlative-phase-discriminators that are intended to reduce multipath, and thus have reduced pull-in capability.

Furthermore, there are additional techniques than may be employed to generate a shifted EML. For example, rather than adding a prompt correlation to an EML correlation, any constant can be added to an EML correlation to shift its x-axis crossing point. It is advantageous to have this constant proportional to the prompt correlation so that the location of the x-axis crossing is more-or-less invariant to signal power fluctuations.

Another method to generate a shifted correlation is to simply shift in time the early and late (or early-minus-late) codes used to generate the correlation.

Yet another method is to use the EML correlation without adding a signal to shift its value. Instead, assign a threshold and when the EML correlation exceeds the threshold, use the EML directly for dead-zone compensation. Otherwise do not use the EML correlation.

It is to be understood that while certain embodiments and/or aspects of the inventions have been shown and described, the invention is not limited thereto and encompasses various other embodiments and aspects.

Having thus described the invention, what is claimed and desired to be secured by Letters Patent is as follows:

1. A method of determining the phase of a code signal where the code C consists of a known sequence of positive and negative symbols of average width T, where T>0, which method comprises the following steps: generating a first correlation kernel, by using a correlator system, that corresponds to non-transitions of the code signal and has a first correlation kernel shape; generating a second correlation kernel, using the correlator system, that corresponds to transitions of the code signal and has a second correlation kernel shape independent of the shape of the first correlation kernel; and producing a correlative phase discriminator by multiplying at least one of the said correlations by at least one scale factor, and adding together the first and second correlation kernels after at least one is multiplied by the said scale factor.

2. A method of determining the phase of a code portion of a signal where the code C consists of a known sequence of positive and negative symbols of average width T, where T>0, with the method comprising the following steps:
 generating, by using a correlator system, a first track reference signal S1 consisting of both zero and non-zero segments such that when S1 and C are aligned in phase, all non-zero segments of S1 occur within a width T/2 of the symbol boundaries of C that exhibit level transitions, either positive-to-negative or negative-to-positive; and providing the signal S1 with the further properties that:

each non-zero segment of the product of C and S1, when phase aligned, has a right-hand portion and a left-hand portion with the right-hand portion occurring later in time than the left-hand portion and the division between right and left coinciding with a symbol boundary of C;

the mass-balance sum of all right-hand portions is zero; and the mass balance sum of all left-hand portions exhibits a non-zero value B1, generating, using the correlator system, a second track reference signal S2 consisting of both zero and non-zero segments such that when S2 and C are aligned in phase, all non-zero segments of S2 occur within a width T/2 of the symbol boundaries of C that exhibit no level transitions, with the signal S2 having the further property that:

the mass-balance sum of the product of C and S2, when phase aligned, has a non zero value B2;

performing, using the correlator system, a first correlation by accumulating of the product of D and S1 to provide a first correlation kernel with a first correlation kernel shape;

performing, using the correlator system, a second correlation by accumulating of the product of D and S2 to provide a second correlation kernel with a second correlation kernel shape independent of the shape of the first correlation kernel;

determining at least one scale factor based on the values of B1 and B2;

multiplying at least one of the said correlations by at least one said scale factor;

forming an error discriminator by adding together the first and second correlation after at least one is multiplied by the said scale factor; and using the error signal, control the phase of S1 and S2 so that the error discriminator is driven to zero.

3. The method of claim 2 where the scale factor is based on the number of symbol boundaries of C that exhibit level transitions and on the number of symbol boundaries of C that do not exhibit level transitions.

4. The method of claim 2 where the signal S1 and the signal S2 are combined into one composite signal S where at least two correlations are formed by accumulating the product of S and D, with at least one correlation corresponding to symbol boundaries of C with level transitions and with at least one correlation corresponding to symbol boundaries of C with no level transitions.

5. The method of claim 2 where S1 and S2 are further broken down into sub-signals, that when all sub-signals are added together produce the sum of S1 and S1.

6. A method of providing dead-zone compensation to a first correlation kernel in a correlative phase error discriminator system, which method comprises the steps of: providing a first correlation kernel, where said first correlation kernel has a zero value at a nominal track point, a non-zero value to the left and right of the nominal track point, and a zero value in a dead-zone that is not located at the nominal track point; providing a second correlation kernel with a zero value within a zero-band that includes the nominal track point of said first correlation kernel and a non-zero value on one side of the zero-band; measuring a phase error using said first correlation kernel; and providing dead-zone compensation to said first correlation kernel using said second correlation kernel by adding a compensation term to the measured phase error of said first correlation kernel whenever said second correlation kernel reads a non-zero correlation value outside of its zero-band with said compensation term proportional to the size of the non-zero correlation value.

7. The method of claim 6, which includes the additional steps of: providing an Early-Minus-Late (EML) correlation kernel; providing a prompt correlation kernel; scaling said prompt correlation kernel; summing said EML correlation kernel with said scaled prompt correlation kernel to shift said EML correlation kernel and thereby provide said second correlation kernel; and providing said dead-zone compensation to the phase error discriminator system by zeroing said second correlation kernels within said zero-band including said nominal track point and employing said combined first and second correlation kernels in a code phase tracking loop.

8. The method of claim 7 where the shifted EML correlation kernel is zero for code phase errors that are near to zero.

9. The method of claim 8 where the shifted EML correlation kernel is zero for positive code phase errors.

10. The method of claim 8 where the shifted EML correlation kernel is zero for negative code phase errors.

11. The method of claim 7 where:

the shifted EML correlation kernel is employed in a code phase tracking loop for the purpose of preventing the track loop from losing lock;

the track loop employs a separate correlator for tracking code phase errors; and said separate correlator is designed to aid in the tracking of code phase error while not being responsive to at least some forms of multipath.

12. The method of claim 7 where:

the shifted EML correlation kernel is employed in a code phase tracking loop for the purpose of aiding in the initial acquisition of code phase;

the said track loop employs a separate correlator for tracking code phase errors; and said separate correlator is designed to aid in the tracking of code phase error while not being responsive to at least some forms of multipath.

* * * * *